United States Patent [19]
Keller et al.

[11] Patent Number: 5,134,944
[45] Date of Patent: Aug. 4, 1992

[54] PROCESSES AND MEANS FOR WASTE RESOURCES UTILIZATION

[76] Inventors: Leonard J. Keller; Austin N. Stanton, both of 1501 N. Cedar St., Bonham, Tex. 75418

[21] Appl. No.: 662,362
[22] Filed: Feb. 28, 1991
[51] Int. Cl.[5] .............................................. F23B 7/00
[52] U.S. Cl. ................................ 110/234; 48/DIG. 2; 110/229; 110/233; 110/346; 122/1 R; 122/2
[58] Field of Search .............. 110/235, 233, 234, 346, 110/229; 122/1 R, 2; 48/209, 111, DIG. 2

[56] References Cited
U.S. PATENT DOCUMENTS

| | | | |
|---|---|---|---|
| 4,753,181 | 6/1988 | Sosnowski | 110/346 |
| 4,960,056 | 10/1990 | Pillsbury | 110/233 |
| 5,022,330 | 6/1991 | Burgher et al. | 110/235 |

Primary Examiner—Edward G. Favors
Attorney, Agent, or Firm—Geoffrey A. Mantooth

[57] ABSTRACT

Gasification, slagging, melting, and vaporizing components of waste materials and reactive carbon fuel, in variable proportions, at low pressures, using oxygen and steam reactants, effects very high temperatures, producing syngas (hydrogen and carbon monoxide), molten slag and molten metals. Integration provides steam and electricity from cogeneration plants. Thermal separation of coal-methanol suspensoids, delivered by pipeline, provides reactive carbon fuel. Methanol produced from cleaned syngas and ethanol produced by corn fermentation are blended, some gasoline or diesel fuel and other additives are used, safer, cleaner-burning, cost-competitive automotive fuels are produced. Lightweight, rock-like nodules (aggregates) and rock wool are produced from slag. Recovery of metals effects optimum recycling. Some metals are produced by reducing reactions. Ethanol coproducts combined with corn, other grains, alfalfa, molasses, minerals and vitamins, provide superior feeds for ruminant animals. Byproducts of syngas cleaning are recovered and marketed. No remaining solids, no disposal problems.

13 Claims, 4 Drawing Sheets

A-A

PROCESSES AND MEANS FOR WASTE RESOURCES UTILIZATION

FIELD OF THE INVENTION

This invention relates to combined gasification, slagging and metals production from combined feedstocks of solid waste materials and coal or lignite-derived particulate carbon fuel; integrated with cogeneration electric power facilities, and with facilities for the production of fuel methanol, building materials, fuel ethanol, feeds for ruminant animals, blended alcohol fuels and various byproducts of syngas cleaning.

REFERENCES CITED

Pertinent are the following U.S. Patent Documents:

| | | |
|---|---|---|
| 4,953,479 | 9/4/90 | Keller; Stanton |
| 4,742,784 | 5/10/88 | Keller; Stanton |
| 4,192,651 | 3/11/80 | Keller |
| 4,164,366 | 3/27/79 | Keller |
| 4,097,217 | 6/27/78 | Keller |
| 4,095,092 | 8/30/77 | Keller |
| 3,306,501 | 2/28/67 | Keller |

BACKGROUND OF THE INVENTION

Most of the industrialized nations of the World are faced with very serious problems in attempting to develop environmentally sound and economically affordable methods for disposing of their municipal solid waste, other solid wastes and hazardous waste materials. The problems appear most extensive, serious and costly in the major metropolitan areas of the United States. The so-called "sanitary landfills" have never provided environmentally practical or desirable means for disposing of solid waste materials, but have the convenient advantage of Substantially concealing the problems. Their shortcomings and the serious environmental degradation they cause are becoming vividly apparent as the problems mount. Most of the existing landfills contain unknown quantities of materials now classified as "hazardous waste".

However, landfills remain the primary means used for placing the problems "out of sight-out of mind". Improved landfill criteria and techniques, soon to be required, can perhaps provide less undesirable means of permanent storage in landfills, than has been practiced in the past, but generally at substantially greater costs. The new improved landfills, however, do not seem to provide either environmentally desirable or economically attractive solutions for the problems of solid waste disposal.

The current methods of solid waste disposal typically result in the wasting of very valuable energy and materials resources. Given adequate processing technologies, these resources can be advantageously and profitably recovered and utilized for producing clean-burning alternative fuels, various types of useful building materials, large tonnages of valuable metals, and various useful byproducts. Their recovery and utilization can also effect conservation of energy and fuels, mineral resources, and valuable land otherwise required for landfills.

The fuel alcohols and the blended-alcohol fuels produced can be most beneficial for supplementing the limited gasoline and diesel fuel supplies available from the rapidly diminishing liquid petroleum resources of this Nation. Producing and using such fuels by the processes and means provided can substantially reduce the Nation's critical dependence on unreliable, politically dangerous, and expensive imported crude oil, by replacing automotive fuels equal to about one-third of the Nation's peacetime gasoline consumption. High employment, industrial revitalization, economic stability and stronger national defense could result from broad-based development of these technologies.

The high-quality building materials which can be produced are very valuable, and their production can reduce the amount of quarrying and dredging required, as well as conserving considerable amounts of production and transportation energy otherwise required. The metals which can be recovered for reuse, again and again, are obviously very valuable, and this means of repetitive reuse, or continuing recycling, can also reduce the amount of mining required and the large amounts of energy required for mining our remaining low-grade ores and for producing metals from the ores. The other byproducts will also be useful and can conserve energy in various ways, one of significance being the heat energy otherwise required for extraction of elemental sulfur from the earth. Coproducts can be produced at lower costs than by other means, thus stimulating industrial activity and U.S. competitiveness in the World's marketplaces.

Substantial savings can be realized by eliminating the costly means currently used for permanently burying solid waste materials in landfills, or for incinerating them and then burying the remaining, often more toxic, solid waste from the incinerators. Savings can also be realized by effecting more profitable and beneficial use of the waste resources, compared to producing refuse-derived fuels, which have limited profit potentials and complicate other environmental problems. The crude oil resources of the United States have been depleted to the extent that the Nation is now critically dependent, for more than one-half its needs, on foreign sources of crude oil and petroleum products, to maintain its basic economy and its national defense. This presents serious problems for both our Nation and for the entire World. Reducing the quantities of crude oil needed, while also reducing fuel costs, could obviously be most beneficial to the Nation and the World.

Attempts have been made to use various types of incineration as means for reducing the amount, or volume, of materials which must be buried in landfills. However, few of these types of projects have survived, and few if any have provided economically affordable improvements or effective solutions to the solid waste problems. Various attempts have also been made to utilize solid wastes directly, blended with other fuels, or after some form of processing, as fuels for producing steam for electric power generation or for use in processing, space heating and air conditioning applications. While some projects have proven technically feasible, few if any have proven to be either environmentally desirable or economically attractive. Most waste energy recovery projects which are in operation cost the municipalities more than the original landfills they replaced, and it is perhaps questionable if they represent substantial environmental improvements.

Large amounts of funding for research and development have been appropriated and spent by Government and Industry, in attempts to find practical answers to the problems of dealing with solid waste materials, with only limited amounts of realistic improvement or useful knowledge having evolved therefrom. The problems, as evidenced by very frequent news accounts, remain largely unsolved, and there seem to be no environmentally acceptable, economically feasible, and realistically affordable solutions provided by the present state-of-the-art technologies.

There have also been very large expenditures of research and development funds in attempts to commercially develop the alcohol fuels, both methanol and ethanol, as alternative fuels, primarily for replacing petroleum-based gasolines. This could ease the rapidly escalating problems of providing crude oil-based transportation fuels for the Nation, from expensive and politically unreliable foreign crude oil. Obviously, the alcohol fuels can be produced from non-petroleum feedstocks. However, the state-of-the-art technologies and available business strategies have not produced significant quantities of commercially available alcohol fuels, even with substantial federal and state incentives of various types. Attempts to mandate the use of alcohol fuels, have resulted instead in "oxygenated fuels" being mandated, which allows continued reliance and dependence on petroleum-based products. This encourages the petroleum-oriented refining industry to continue the use of petroleum-based additives, instead of using alcohols, and the well intended efforts have been counterproductive. The use of alcohol fuels to supplement gasolines has contributed very little if anything toward reducing the Nation's critical dependence on foreign crude oil, which is favored by the petroleum-based multi-national and domestic fuels industries, because they both benefit greatly from continued national dependence on foreign crude oil and the resulting price escalations, as the Nation, its economy, and its people suffer the consequences.

The use of neat methanol (methanol alone) as an automotive fuel, requires special engines for optimum performance, or modifications of the engine's carburetion or fuel injection systems, if conventional engines are used. Some problems still remain in using methanol, as such, as a fuel for Otto cycle engines. Also, it has not been possible to develop sufficient large markets for fuel methanol to encourage its production on a large enough scale to achieve reasonably low production costs and market prices. While a thorough, in-depth government-funded study has substantially proven that fuel methanol could be produced from remote off-shore natural gas, available in tremendous quantities in many areas throughout the World; and could be profitably sold for about twenty cents per gallon at the ship-mounted plants, there have been no projects developed or planned to produce such low-cost fuel methanol. Future fuel methanol prices are still being predicted at forty to eighty cents per gallon by Oil Industry, Chemical Industry, Research Institute and Department of Energy sources, for some unclear reason.

Fuel ethanol as a neat fuel (ethanol only), performs very well in the Otto cycle engines, but it is too expensive to be competitive with gasolines, as ethanol is now produced. Break-even costs without subsidies, in 1989, were generally about one dollar and twenty cents per gallon, for producing fuel ethanol by fermentation of corn, which makes it a very expensive automotive fuel. The costs are also critically dependent on the price of corn, and this has been devastating for most would-be producers, causing many to become bankrupt. The net energy benefits resulting from the use of ethanol as a fuel are controversial, and it may be questionable whether the Federal and State subsidies proposed and effected are economically and practically justifiable.

Considerable energy in various forms is required for providing the feedstock grains and for producing fermentation fuel ethanol. Some argue that it is not feasible from the energy balance standpoint. The energy benefits-versus-energy costs analyses are very complex and have historically been controversial. The energy arguments have no relevance for the processes and means provided herein, because the steam is provided very efficiently from cogeneration steam-electric power plants, to provide the heat energy for the fuel ethanol plants. Most of the arguments about wasting food values are essentially fiction or deliberate misrepresentation, since practically none of the real food value of corn is utilized in the fermentation process. In fact, there is considerable reason to believe that the actual effective food values of the co-products of ethanol production may exceed those of the corn feedstock as animal feeds, and there are potentials for improved food supplements as well.

The present invention provides effective practical solutions for most of the very difficult solid waste disposal problems. The solutions provided are of such a nature that effecting the solutions will be very profitable, instead of costly, and can beneficially affect many aspects of the Nation's economy as well, which is rather unique to say the least. The fuels can be sold at bargain prices to the motoring public or to vehicle fleet owners, without federal or state subsidies, and the same federal excise tax and state and city taxes, per unit of fuel value, can be paid on these new fuels as are paid for gasolines. The sale prices for the methanol-ethanol-gasoline and additive fuels, which are called Trinary Fuels, should be in the range of sixty cents per gallon, at the production facilities, based on mid-1990 values of the dollar.

One gallon of Trinary Fuels should be the equivalent, in miles driven, to about two-thirds of a gallon of premium-quality unleaded gasoline; perhaps equivalent to more than this amount of gasoline, when used in the latest model auto engines, or in the dual-fuel engines, which are more ideally suited to the Trinary Fuels. There are sufficient solid waste materials collected in the United States, according to data provided by the U.S. Environmental Protection Agency, to produce enough Trinary Fuels to replace about one third of the peacetime total gasoline consumption of the Nation. This could more than offset U. S. dependence on Persian Gulf crude oil, allowing the purchase of imported crude at reasonable prices from other areas of the World, and from more dependable sources, to suffice for supplementing our domestic crude oil supplies for gasoline, diesel fuel and aviation fuel production.

SUMMARY OF THE INVENTION

The invention provides energy conserving and resource conserving processes and means for the combined, or integrated, utilization of solid waste resources, coal and lignite resources, and agricultural resources for producing very large quantities of reasonably-priced non-petroleum transportation fuels to supplement gasoline and diesel fuel supplies available from our remaining economically recoverable crude oil resources. New types of gasifying furnaces, using coal or lignite-derived particulate carbon fuel combined with fragmented solid waste materials and other waste materials as gasification feedstock, and integrated with cogeneration steam-electric power facilities, provide clean pressurized syngas, from which fuel methanol is produced. A fermentation ethanol plant produces fuel ethanol and valuable co-products from corn, which co-products are used with corn, alfalfa, other agricultural products, minerals and vitamins for producing superior-quality feeds for ruminant animals. The two alcohols are blended, using about two parts fuel methanol and one part fuel ethanol, with about ten percent of gasoline or diesel fuel added. Minor amounts of other additives are also used, to optimize fuels for specific end-uses. This provides high-quality low-pollution transportation fuels for both Otto cycle and Diesel cycle engines, to supplement gasoline and diesel fuel supplies.

The useful and valuable co-products and byproducts of the integrated projects utilizing the processes and means provided include superior-quality feeds for ruminant animals, light-weight granular aggregates, dense slag-rock crushed aggregates, rock-wool insulating materials, elemental sulfur, repeatedly recovered (recycled) metals, metals produced by reduction reactions, and cryogenic gases. The integrated production of these materials effects significant conservation of both energy and resources. Large-scale utilization of the processes and means of the invention can help stabilize the Nation's weakened economy and strengthen its defense capability, while revitalizing the agricultural industries, the coal and lignite mining industries, the domestic fuels industries, the transportation industries, and the construction industries. The invention provides the integrated processes and means whereby solid waste containment landfills, solid waste incineration projects, and refuse-derived fuels projects can all be beneficially and profitably replaced with solid waste resource utilization projects. The environmental impacts of mankind's solid waste producing and energy related activities on the Global Environment can thus be substantially reduced.

Principal purposes of the invention are to recover and utilize all of the substances and values of the debris of modern life, to reduce mankind's impact on the Global Environment, and to eliminate the need for landfills, burying of medical and hazardous wastes, solid waste incineration projects, projects for producing refuse-derived fuels, and proposed requirements for home sorting of waste materials.

Another principal purpose is to supplement our rapidly depleting domestic resources of economically recoverable crude oil by providing very large quantities of low-pollution blended alcohol fuels at competitive prices, and without government subsidies.

Another purpose is to improve economic conditions and human and animal health in the United States by revitalizing the agricultural industries, the coal and lignite mining industries, the domestic fuels industries, the transportation industries and the construction industries, and by substantially improving environmental conditions associated with solid wastes, other waste materials and energy utilization.

Another purpose is to increase productive employment and viable investment opportunities in this new solid waste utilization industry, and also by proliferation of other industries and businesses supporting and resulting from its beneficial activities, in addition to those industries hereinbefore cited.

A last, but by no means least, purpose is to extend these benefits to all the peoples of the World.

BRIEF DESCRIPTION OF THE DRAWINGS

The drawings are provided to facilitate the understanding of the present invention and the advantages and significance thereof.

DETAILED DESCRIPTION OF THE INVENTION

The present invention makes use of new technologies, accumulated knowledge and other inventions, which have evolved during the past several years, in both related and unrelated fields, and adds thereto the unique new features necessary to provide practically, technically and economically feasible and environmentally beneficial answers for the very difficult problems encountered in attempts to provide practical, acceptable means for the disposal of municipal solid waste and other solid wastes, referred to collectively herein as solid waste materials. This is made possible by providing the process and means of the invention for essentially complete chemical and physical restructuring and subsequent utilization of the resultant products from most non-radioactive solid waste resource materials which can be reduced by fragmentation, or shredding, to relatively small particle sizes, including most medical and biological waste materials and many materials classified as hazardous waste.

The smaller particle sizes of solid waste materials achieved by fragmentation facilitates the very rapid high-temperature complete oxidation, partial oxidation and gasification reactions of preheated oxygen with the combustible portions of the solid waste feedstock materials, simultaneous with the gasification reactions of premixed oxygen and superheated steam with the highly reactive coal or lignite-derived particulate carbon fuel also used as gasification feedstock material. The process and means provided effect sufficiently high gasification reaction temperatures to liquefy (or slag) all of the non-metallic, non-combustible components in the combined feedstock materials and in the additives used;

to melt or vaporize all the metals therein; to reduce some metals in metal-bearing compounds present to the metallic form; and to leave no solid residue or waste materials which require the use of landfills or other means of storage to effect disposal thereof. Essentially all of the components of the feedstock materials and additives are converted to marketable products, coproducts and byproducts, except for relatively minor amounts of the inert gases, carbon dioxide and nitrogen.

Figure 1:
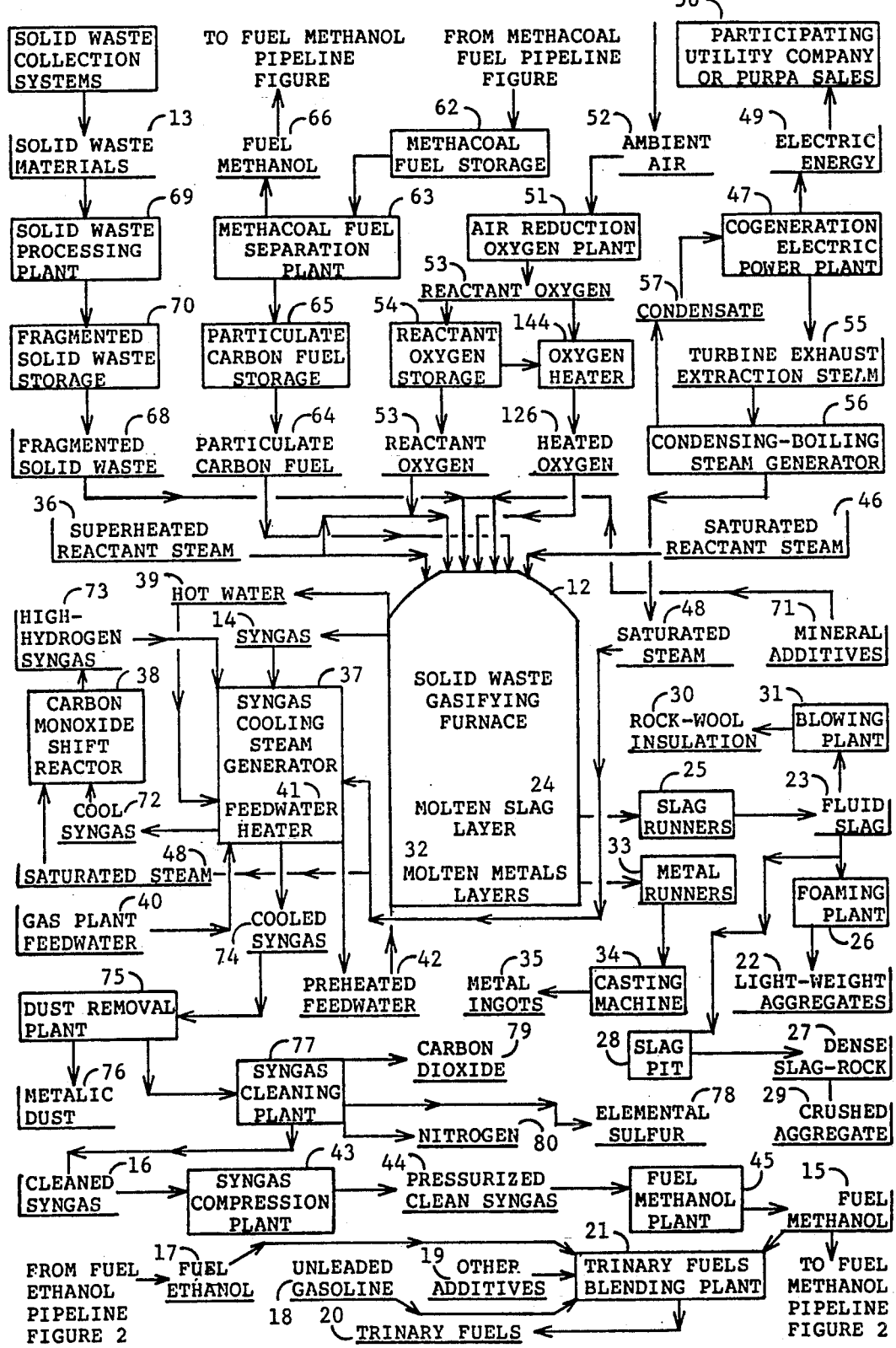
FIG. 1 is a flow diagram of the processes and facilities for the combined utilization of solid waste resources and coal or lignite resources, and for fuel methanol production, co-product and byproduct recovery and utilization, and the Trinary Fuels (blended alcohol fuels) production portions of the preferred embodiment.

Referring to FIG. 1, the integrated process flow diagram depicts a principal portion of the preferred embodiment of the present invention. An improved solid waste gasifying furnace 12, described in more detail hereinafter, is used in unique ways for simultaneously gasifying, slagging, melting and vaporizing the components of the solid waste materials 13, to produce a gaseous mixture, often called synthesis gas, hereinafter referred to as syngas 14, coproducts consisting of slag-derived building materials and metal ingots, and byproducts including metallic dust, elemental sulfur, carbon dioxide and nitrogen. The syngas exiting the gasifying furnace is a gaseous mixture containing principally hydrogen and carbon monoxide, with relatively small amounts of inert gases such as carbon dioxide and nitrogen, very small amounts of vaporized metals, some entrained unreacted carbon, and inorganic mineral dust.

Such syngas is used, after adequate preparation described hereinafter, as feedstock for the production of fuel methanol 15, using conventional catalysts, methods and facilities, for fuel methanol production. Such conversion to fuel methanol facilitates optimum utility and economics for the process and means of the invention, which make the complete utilization of most solid waste resource materials profitable, practically feasible, and environmentally most desirable. The integrated process and means of the present invention can provide new, low-cost sources for great quantities of fuel methanol, which can serve many economically beneficial and environmentally desirable purposes, as will be shown.

The mole ratio of two moles of hydrogen to one mole of carbon monoxide must be provided in the product syngas, to provide acceptable feedstock for the standard methanol production facilities used for producing the fuel methanol. This ratio must be adjusted, if there is not sufficient hydrogen in the initial syngas, as it is produced in the gasifying furnace. This mole ratio adjustment is accomplished by use of the carbon monoxide shift reaction, a conventional chemical process further described hereinbelow, to produce the additional hydrogen which will generally be needed for this purpose. Provision is made for this capability in the process and means of the invention, because of the highly variable nature of most solid waste materials available for use as feedstock for gasification, even though it may be possible, at times, to produce syngas with sufficient hydrogen content, as it exits the solid waste gasifying furnace.

The product syngas is first cooled sufficiently, in the syngas cooling steam generator, to allow operation of a carbon monoxide shift reactor, for producing a stream of high hydrogen content syngas, which is used for adjusting the ratio of hydrogen to carbon monoxide in the product syngas. After the ratio adjustment is completed, the syngas is cooled sufficiently, in the syngas cooling steam generator and the feedwater heater, to allow cleaning of the syngas by the removal of particulate materials (dust). The syngas is then purified by removing contaminants and diluents from the cooled syngas; using proven, existing, conventional syngas cleaning methods and equipment. The proven and available methods and equipment most often used for the cleaning and purification of syngas, produced by coal or lignite gasification, are described in "Chemistry of Coal Utilization, Supplementary Volume, H. H. Lowery, Editor, Copyright 1963, by John Wiley and Sons, Inc., pages 1014 to 1022". Such methods and equipment have recently been commercially demonstrated and used in the United States, for syngas cleaning in coal and lignite gasification projects.

One such demonstration has been and is provided by the Great Plains Coal Gasification Project near Beulah, N.D., which provided a two billion dollar lignite gasification demonstration for producing synthetic natural gas (SNG). The project facilities have been in commercial operation for several years, and adequate gas cleaning capability has been well demonstrated on a very large scale. Another commercial demonstration was provided recently by the Cool Water Coal Gasification Program, an association of six industrial, institutional and government agency partners, which designed, constructed, operated and demonstrated the Cool Water Integrated Gasification Combined Cycle (IGCC) Power Plant at Doggett, Calif. The Cool Water Project facilities gasified relatively high sulfur coal, during a five-year commercial demonstration program, and produced syngas used as fuel for the gas turbines of the combined cycle electric generating plant, producing electric energy for Southern California Edison Company. It has been reported that the entire facility met and exceeded the air quality control requirements of the State of California, thus demonstrating satisfactory syngas cleaning and optimum environmental controls.

The cleaned syngas 16, of the present invention, is converted to fuel methanol, to provide optimum utility and economics for the process and means of the invention, for effecting the complete utilization or solid waste resource materials. The present invention provides for the co-utilization of solid waste resources, fossil fuel resources and agricultural resources, as depicted herein as the preferred embodiment, for providing new low-cost sources for great quantities of blended alcohol fuels, containing fuel methanol and fuel ethanol, called Trinary Fuels. The fuel methanol, produced from solid waste materials and coal or lignite-derived particulate carbon fuels, requires no scarce crude oil or natural gas as feedstock, and can serve many beneficial and environmentally desirable purposes, as described hereinafter.

As is proven and very well known, fuel methanol can be used as an automotive fuel for either specially designed or modified conventional Otto cycle engines. It can also be used as the principal component of automotive fuels which contain small percentages of low-octane unleaded gasoline. The gasoline is used for giving color to the flame in event of accidental fires and for improving cold start capability. It also slightly increases the fuel value of the mixture. One such example is the popularized "Mobil Formula", proposed by Mobil Oil Corporation and probably by many others. This fuel is eighty-five percent methanol and about fifteen percent gasoline, with some beneficial additives.

It has also been proven and demonstrated that fuel methanol may be used with an additive called "Avocet", developed by Imperial Chemical Industries, ICI PLC, of Great Britain, to provide an environmentally preferable, non-petroleum replacement for diesel fuels for use in Diesel cycle engines. For reference, see "Testimony by Mr. Glenn Short of ICI Americas to the California Committee on Energy and Commerce, Sub-Committee on Health and the Environment, Los Angeles, Calif. January, 1989".

However, the fuel methanol of the present invention may be used most advantageously and beneficially as the principal ingredient for producing low-cost, low-emissions, non-petroleum transportation vehicle fuels by the integrated process and means of the present invention. This is accomplished by providing low-cost fuel ethanol 17 for blending with the fuel methanol; and using unleaded gasoline 18 and other additives 19, to improve fuel performance characteristics. The unleaded gasoline and other additives are used to increase the fuel value, facilitate cold starting, allow adjustments of fuel composition and additives to accommodate changes in climate and elevation, provide lubrication and corrosion resistance, and add color to the alcohol flames in event of accidental fires. One example of such blended alcohol fuels, which are called "Trinary Fuels (TF)" 20, is approximately sixty percent fuel methanol, thirty percent fuel ethanol, eight to nine percent low-octane unleaded gasoline, one to two percent diethyl ether and/or other ethers; with very small amounts of commercially available anti-corrosion additives and beneficial lubricants.

The Trinary Fuels technologies, developed by Methacoal Corporation, can provide superior-performance blended alcohol fuels, produced in a Trinary Fuels blending plant 21. Trinary Fuels are useful as gasoline replacement fuels for Otto cycle engines powering automobiles, trucks, buses, tractors, aircraft, and other vehicles, and for use in stationary Otto cycle engines. Some minor changes to the fuel system equipment, and to the carburetors or fuel injection systems, may be required for many vehicles, because they were designed specifically to tolerate the corrosive gasolines. However, some fuel systems and many carburetors and fuel injection systems may require no modifications whatever, or only very minor changes. The Trinary Fuels should be the best of all fuels for the so-called multi-fuel vehicles now planned. Similar Trinary Fuels, (not shown), with a small percentage of diesel fuel added, instead of gasoline, and using the additive "Avocet", referred to hereinbefore, may be used to replace diesel fuels in Diesel cycle engines of all types.

The fuel methanol of the present invention, produced from the cleaned syngas, by the conventional and well-known "methanol synthesis process", can thus sell in cost competition with the expensive liquid hydrocarbon automotive fuels (gasolines and diesel fuels). These fuels sold in the retail price range of eight to nine dollars per million British Thermal Units (MM Btus) in the United States, during early and mid-1990. These prices may be expected to escalate dramatically in the near future. The fuel methanol can probably be profitably sold in the price ranges of about one-half the cost per Buu compared to gasoline and diesel fuels. This mode of utilization for the clean syngas is preferable, from the standpoint of profitability and also of national interests, to producing synthetic natural gas (SNG), another product which could be produced from the cleaned syngas.

Synthetic natural gas, if produced from the syngas, would have to compete with natural gas recovered from the Earth's natural reservoirs. Such natural gas has historically sold for about one-fourth to one-half the prices per million British thermal units (per MM Btu), compared to the gasolines and diesel fuels. Such SNG has been, and still is, produced from lignites in high-pressure gasification facilities in North Dakota. Those facilities cost the U.S. Taxpayers about two billion dollars, and necessitated subsidizing fuel prices for the SNG produced and sold to natural gas marketing companies. The partially-slagged ash from the project is basically worthless waste material, which must be disposed of at considerable cost and with substantial environmental concerns.

This one-and-only large U. S. synthetic natural gas, or SNG, project was originally developed as the Great Plains Coal Gasification Project of several companies and the U.S. Synthetic Fuels Corporation, was later transferred to the U.S. Department of Energy, and is now owned by the Basin Electric Power Cooperative. It was a very costly experiment for both Industry and Government, and is also a prolific producer of carbon dioxide emissions. Recommendations developed by the inventors hereof, with the cooperation of the management and engineering staff at the project, indicated that the Great Plains Coal Gasification Project could very probably have been made sufficiently profitable to repay the entire investment of the Public, if fuel-grade methanol had been co-produced in optimum proportions, with SNG, and if the fuel methanol could have been sold at prices considerably lower, on a cost per Btu basis, than the hydrocarbon liquid fuels, or about twenty-five to thirty cents per gallon.

In other embodiments, mixtures of methanol and higher alcohols may be produced, instead of fuel methanol, from the cleaned syngas, using conventional, well-known, and available equipment and catalysts. In some situations, this may be preferable to, or more profitable than, the production of fuel methanol alone. One such mixture of methanol and higher alcohols, and the processes and catalysts for producing such fuels were developed many years ago by Wentworth Brothers Engineering Company, of Cincinnatti, Ohio. The fuels were referred to as Methyl-Fuel, a name which was apparently trademarked by that company. The production of this or other mixtures of fuel methanol and higher alcohols may, in some cases, prove to be more economical than producing fuel methanol as feedstock for Trinary Fuels blending, or for direct use as mixed alcohol fuels. Cleaned syngas can also be provided as feedstock for other chemical processing purposes, such as the production of ammonia, using available conventional methods, where this proves beneficial and profitable.

Figure 3:
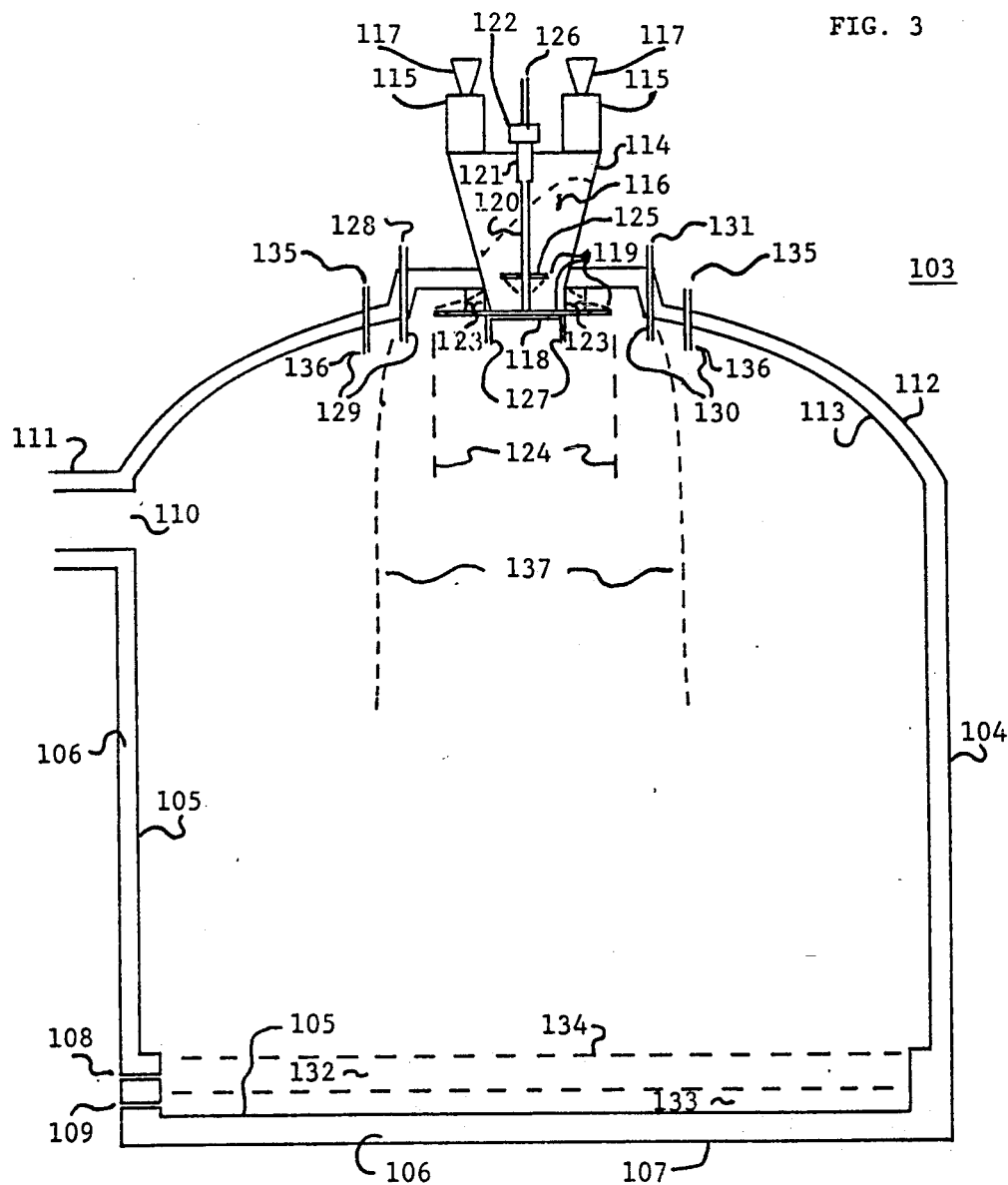
FIG. 3 is a schematic representation, in a vertical cross-sectional view, of the gasifying furnace used in the preferred embodiment.

The methods and equipment for the simultaneous gasification, slagging, melting and vaporizing of solid waste materials and reactive coal or lignite-derived particulate carbon fuel are depicted in FIG. 3, and will be described in more detail hereinbelow. Referring again to FIG. 1, utilizing methods and equipment provided, the coproduct materials, light-weight aggregates 22 are produced from fluid slag 23 of low viscosity, which is removed by conventional state-of-the-art furnace tapping means, from the molten slag layer 24. The fluid slag is moved away from the furnace by conventional slag runners 25, which are simply open troughs lined with refractory materials which can tolerate the high temperatures of the molten slag.

The fluid slag is thus moved to the nearby foaming plant 26, where rounded granules of light-weight aggregate are formed by directing streams of fluid slag, of various controlled small diameters, into pools of water of various depths, and continually removing the foamed aggregates from the pools of water. A similar process, wherein control of the particle sizes was relatively unimportant, was used for many decades for the purpose of preparing large quantities of electric furnace slag for transportation, as water-solids slurries. This means was used for moving the slag away from the slag-tapping areas of the electric furnaces, which were used in the elemental phosphorus industry. The method was abandoned for this use many years ago, primarily because of safety problems resulting from the spontaneous explosive nature of molten ferro-phosphorus metal also produced, upon contact with water. Ferro-phosphorus sometimes became mixed with the molten slag, or was picked up and carried by the slag, and exploded upon contact with water in the granulating process. There were also severe wear problems with the slurry pumps and pipelines used.

Properly sized high-quality granular light-weight aggregates may be used to replace expanded shale, a light-weight aggregate material produced by heating shale to incipient fusion temperatures. This coproduct of the invention thus conserves the fuel energy required for the heating of shales to produce similar, but less durable, light-weight aggregates. Various sized fractions of light-weight aggregates, prepared by screening, may also replace crushed rock, pebble and sand for concrete construction, thus conserving quarrying, processing and transportation energy and providing superior-quality low-density concrete structures. Some sized fractions of light-weight aggregates may also be used as base materials for highway, roadway, airport, parking lot, slab floor, and slab wall construction. Dense rock-like material, called dense slag-rock 27, may also be produced by cooling fluid slag delivered by slag runners, in a slag pit 28, then breaking, crushing and screening the rock-like slag to produce crushed aggregate 29, for use in dense concrete, as rail-bed ballast, and for various other purposes. Since the solid waste materials come from areas with large populations and much commercial and industrial activity, there will always be substantial markets nearby for the building materials produced.

Rock-wool insulation 30, can also be produced by blowing of molten slag with steam or air, in a conventional blowing plant 31. For reference see "McGraw-Hill Encyclopedia of Science and Technology, 1960, Vol. 6, page 208b". The rock-wool insulation materials can thus be produced without the fuel requirements generally required for melting the rock and clay materials used for the production of rock-wool insulation, thereby greatly reducing the energy requirements and manufacturing costs for producing such important inert insulating materials.

Molten metals are recovered from the molten metals layer 32, beneath the molten slag layer, and nearer the bottom of the furnace; and are passed by metal runners 33, which are refractory-lined troughs such as those used in the iron blast furnace industry, to a casting machine 34, of the same type used in pig iron casting operations, for the production of metal ingots 35, useful for further refining (not shown) and the production of elemental metals and metal alloys. For reference see "McGraw-Hill Encyclopedia of Science and Technology, 1960, Vol. 7, page 261".

Superheated reactant steam 36, is produced by using heat energy recovered from cooling of the hot syngas in the syngas-cooling steam generator 37; cooling of the syngas duct-work; cooling of syngas in the carbon monoxide shift reactor 38; cooling of the furnace shell and other equipment to produce hot water 39; passing gas plant feedwater 40 through a feedwater heater 41, to provide preheated feedwater 42; interstage cooling of syngas in the syngas compression plant 43 providing pressurized clean syngas 44; and cooling of the synthesis reactor (not shown) of the fuel methanol plant 45. Superheated reactant steam from the syngas-cooling steam generator, the production of which is described in more detail hereinbelow, is used in the gasification process. Superheated steam may also be used for driving steam turbines (not shown) in the processing facilities, and the turbine exhaust condensate from such turbines is returned to the gas plant feedwater to conserve heat energy and improve the quality of feedwater.

Saturated reactant steam 46, useful in the gasification process and for superheating in the syngas-cooling steam generator, could be provided in another embodiment of the invention, by a fuel-fired steam generating plant (not shown) provided as an integral part of the processing facilities. However, in the preferred embodiment, some form of cogeneration facility is used as shown, to more efficiently and economically provide both steam and electricity for the integrated facilities. This can be accomplished, in other embodiments, by building the solid waste gasifying furnace and other facilities near an existing steam-electric power plant (not shown), and installing a system for extracting steam turbine exhaust steam therefrom, to provide the heat energy for reproducing saturated steam, using feedwater with minimum treatment, in a steam-to-steam heat exchanger system (not shown). The condensate from such a steam-to-steam heat exchanger could be returned to the power plant as feedwater to conserve energy and reduce feedwater requirements and costs.

In the preferred embodiment, a new cogeneration electric power plant 47, of the fossil fuel-fired type, is provided in areas where the additional electric generating capacity and electric energy are needed, or where an existing steam-electric power plant is not available. This cogeneration electric power plant may provide the saturated reactant steam requirements, other saturated steam 48 requirements, and the electric energy 49 requirements for all the processing facilities, and also electric energy for marketing to a participating utility company 50, in the area, or which can be reached by existing or new electric power transmission lines. The surplus cogenerated electric energy may be sold to the utility companies, preferably with their equity participation and profitable and mutually beneficial cooperation.

Alternatively, the electric energy, and sometimes also the capacity, could be sold to electric utility companies under the provisions of the Public Utilities Regulatory Policy Act, (PURPA), if the Federal Energy Regulatory Commission will allow it under their complicated and often-changing guidelines. These cogeneration electric power plants should be eligible for Classification by the Federal Energy Regulatory Commission (FERC), as "Qualified Facilities", of the most desirable nature anticipated and encouraged by the enabling legislation, PURPA.

In another embodiment, coal or lignite-derived particulate carbonaceous fuels (not shown), used for firing the cogeneration electric power plant, could be delivered by closed-loop Methacoal (stabilized coal-methanol slurry fuel) pipeline systems, which can provide very low cost transportation of coal or lignite-derived fuels from the fuel source to the power plant. If thus provided with their fuels, such cogeneration power plants may beneficially use the low nitrogen oxides power generation technologies recently provided by the inventors hereof and Methacoal Corporation in U.S. Pat. No. 4,742,784; "Methods for Reducing Nitrogen Oxides Emissions from Power Plants Fired by Various Coals".

The cogeneration electric power plant of the preferred embodiment can also provide superheated steam (not shown), directly from superheated steam headers in the power plant, for operating steam turbines used to drive compressors (not shown) in the conventional air-reduction oxygen plant 51, which uses ambient air 52 for the production of reactant oxygen 53, which oxygen is stored in reactant oxygen storage 54, for use in the gasification process. Superheated steam is also provided for operating steam turbines used for driving syngas compressors (not shown) in the syngas compression plant. The condensate (not shown) from the exhaust of such steam turbines is returned to the cogeneration electric power plant's condensate reservoirs (not shown), to conserve power plant feedwater, thus reducing feedwater treatment requirements and costs.

The saturated reactant steam, used for mixing with superheated reactant steam, thus supplying superheated reactant steam for the gasification reactions, may be efficiently provided from the cogeneration electric power plant, by using turbine exhaust extraction steam 55, in condensing-boiling steam generators 56, to produce the saturated reactant steam. Saturated steam is also produced in this manner for use as reactant steam in the carbon monoxide shift reactor, for superheating in the syngas cooling steam generator, and for other process and space heating purposes (not shown). This allows achieving optimum efficiencies of energy utilization, and condensate 57, from the condensing/boiling steam generator, is returned to the cogeneration electric power plant to minimize boiler feedwater treatment requirements and costs.

In another embodiment, the cogeneration electric power plant could also be provided as a relatively small Methacoal Integrated Combined Cycle (MICC) Power Plant (not shown), described in U.S. Pat. No. 4,953,479; "Methacoal Integrated Combined Cycle Power Plants", by the co-inventors hereof. The Methacoal-derived pulverulent carbonaceous fuel, which is required for such MICC power plants, could be provided from the same coal or lignite source as the particulate carbon fuel feedstock of the present invention. However, the MICC power plants consume large quantities of fuel methanol, and would seriously reduce the amount of fuel methanol available for producing the Trinary Fuels. The MICC power plants would, therefore, be most applicable and beneficial, for such use, in areas where the Methacoal fuel for the MICC power plant could be delivered from very low cost sources of coal or lignite, and using low cost sources of fuel methanol made from remote low-value natural gas, delivered by pipelines or marine carriers, or by a combination of these two low-cost transportation means, to the Methacoal fuel production site.

Figure 2:
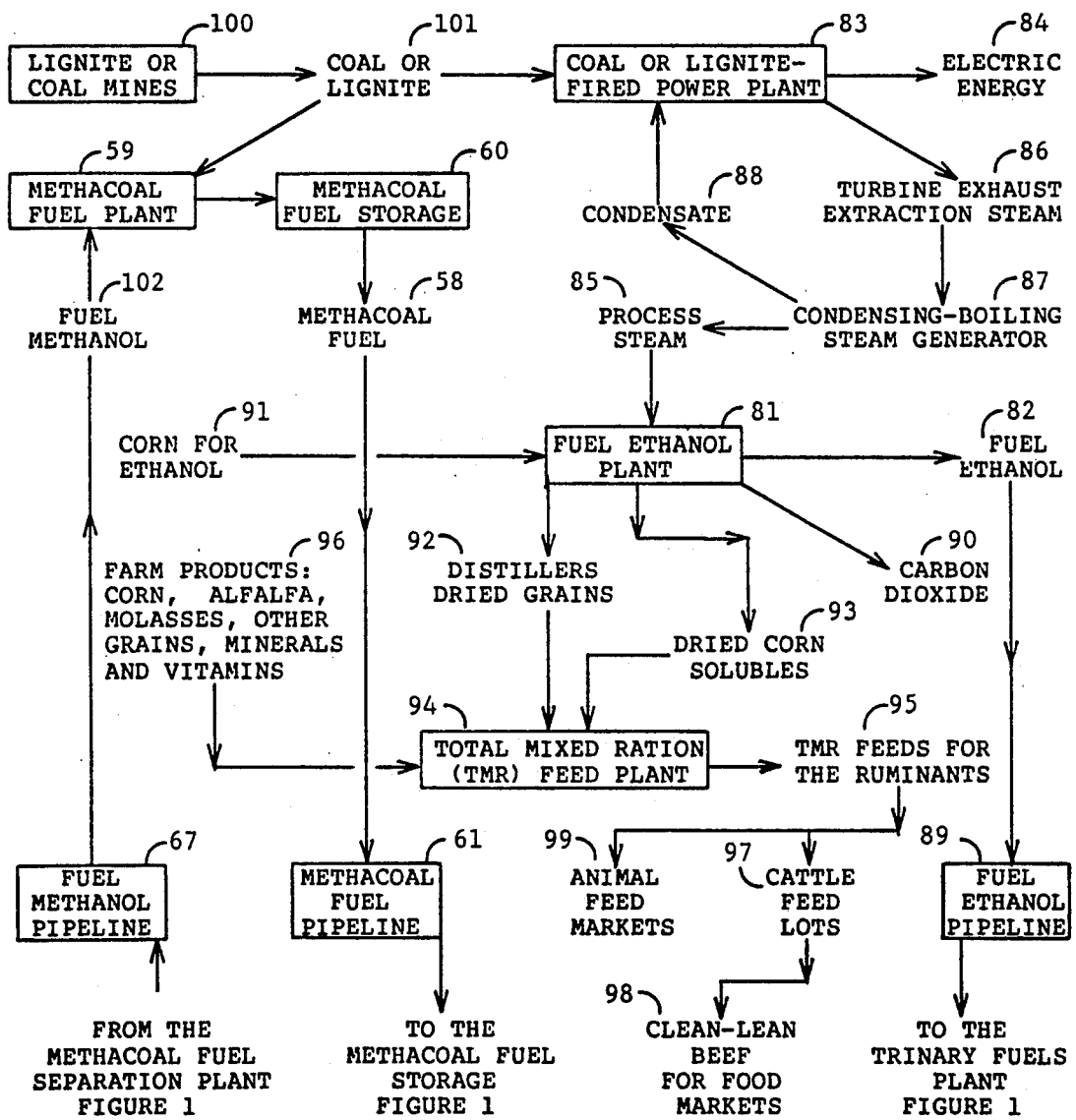
FIG. 2 is a flow diagram of the processes and facilities for the combined utilization of coal or lignite resources and agricultural resources, and for the fuel ethanol production, Methacoal fuel production, and animal feeds production portions of the preferred embodiment.

Referring to FIGS. 1 and 2, both process flow diagrams, Methacoal fuel 58, of the present invention, produced in Methacoal fuel plant 59, is stored in Methacoal fuel storage 60, at or near the production site. It is then delivered by Methacoal fuel pipeline 61, to Methacoal fuel storage 62 at the solid waste gasification project site. There, it is delivered to a Methacoal fuel separation plant 63, for production of particulate carbon fuel (PCF) 64, which is stored in particulate carbon fuel storage 65. The PCF is then used as a highly reactive gasification feedstock for the solid waste gasifying furnace. Fuel methanol 66, separated from the Methacoal fuel in the Methacoal fuel separation plant, is returned to the Methacoal fuel plant by a fuel methanol pipeline 67, paralleling the Methacoal fuel pipeline, or alternatively by another carrier. Makeup fuel methanol for the fuel methanol pipeline and for use in Methacoal fuel production is provided from the fuel methanol plant.

The present invention is facilitated by recent developments in the field of "Methacoal Fuels Technologies", see U.S. Pat. No. 4,045,092, titled "Fuel Composition and Method of Manufacture", and U.S. Pat. No. 4,164,366, titled "Method of Removing Gangue Materials from Coal". These patented inventions and the associated technologies provide low-cost means for drying of the coal or lignite used, for processing of the dried coal or lignite solids in fuel methanol, for producing Methacoal fuels, and for economical transportation of the Methacoal fuels in low-cost metal or plastic pipelines.

The Methacoal fuel is thermally separated at the pipeline terminus, in the Methacoal fuel separation plant, using helical screw processors and multiple disk processors (not shown), as the preferred means for producing the highly reactive particulate carbon fuel. Similar "pulverulent carbonaceous fuels" are described in U.S. Pat. No. 4,192,651, "Method of Producing Pulverulent Carbonaceous Fuel"; and in U.S. Pat. No. 4,742,784, "Methods for Reducing Nitrogen Oxides Emissions from Power Plants Fired by Various Coals", wherein other means are employed for their production. In other embodiments of the invention, pulverulent carbonaceous fuels produced by any of these means may be used to provide the particulate carbon fuels (PCF) of the present invention. The fuel-grade methanol, sometimes called condensate liquid fuel, produced from Methacoal fuels by various means of thermal separation may be returned and reused, again and again, as the fluid medium for producing the Methacoal fuels. This provides economical closed-loop Methacoal pipeline transportation of the pulverulent carbonaceous fuel.

The present invention utilizes a combination of fragmented solid waste 68 and the particulate carbon fuel (PCF), as co-utilized feedstocks for the unique gasification process and equipment provided. The solid waste materials are processed and fragmented in a conventional solid waste processing plant 69, in which the recovery of materials for recycling is optional, and the solid waste materials are reduced in particle sizes to the ranges of about minus one inch or two inch top sizes. Fragmented solid waste is then stored, for short periods of time only, in fragmented solid waste storage 70, of limited capacity, for subsequent feeding to the gasifying furnace. Therein, the solid waste materials are exposed to pure oxygen, admitted at either near-ambient temperatures or at elevated temperatures, in such a manner that some of the materials are partially oxidized and some are completely oxidized, by oxidation reactions which take place very rapidly. This provides carbon monoxide and carbon dioxide for subsequent reactions with carbon and water, which can produce additional carbon monoxide and some of the additional hydrogen required, as will be further described hereinafter.

The particulate carbon fuel, PCF, is highly reactive as the result of the coal or lignite being dried, if not already low in moisture content, before the production of the Methacoal fuel; as the result of the particle sizes being smaller than about one hundred microns; and as the result of multi-molecular layers of methanol molecules remaining attached to both the internal and the external coaliferous surfaces of the coal or lignite-derived particles, after thermal separation from the Methacoal fuel, as revealed in the patents used previously herein as references in the field of Methacoal Fuels Technologies. This highly reactive PCF allows achieving the very rapid gasification reactions and very high initial gas temperatures necessary in the furnace, at near-atmospheric pressures, to liquefy, melt or vaporize essentially all of the non-combustible solids from the fragmented solid waste, from the reactive particulate carbon fuels, and from the mineral additives 71, which are used for controlling the slag chemical composition and the molten fluid characteristics of the slag. See previous reference "Chemistry of Coal Utilization, pages 955 to 957".

The low operating pressures used in the gasifying furnace, and the high gas temperatures achieved during gasification, cause the formation primarily of carbon monoxide and hydrogen gases in the resultant syngas produced. These are the two constituents of the syngas which are required for the catalytic synthesis production of the fuel methanol. These processing conditions also minimize the formation of methane gas and other hydrocarbons in the syngas, see previous reference, "Chemistry of Coal Utilization, pages 895 through 899, and especially FIG. 3, page 897". Hydrocarbon gases would be detrimental in subsequent processing, since the cleaned syngas is used for the production of fuel methanol. Mineral constituents of the ash of many coals and lignites have been found to have beneficial catalytic effects which increase the hydrogen content of syngas produced from coal or lignite in low-pressure high-temperature gasification processes. This has been discovered and confirmed by researchers at the Energy and Environmental Research Center, University of North Dakota, during experimental work in their "Mild Gasification Program" for producing hydrogen and high hydrogen-content syngas from coals and lignites.

The injection of mixtures of superheated reactant steam and oxygen, thoroughly premixed, as is required, into the gasifying furnace, to mix and react therein with the reactive particulate carbon fuel and the fragmented solid waste materials, causes complex inter-related gasification reactions, which produce much of the hydrogen required to provide the two-to-one mole ratio of hydrogen-to-carbon monoxide, which must be provided in the cleaned syngas for its use as feedstock for fuel methanol production. Introducing additional superheated steam, without pre-mixing with oxygen, in areas of the furnace outside the initial gasification reaction zone, can produce additional hydrogen by the reaction of such steam with carbon monoxide to produce hydrogen and carbon dioxide. There are some materials in the coal or lignite ash, in the solid waste materials, and in the mineral additives used, which will inherently serve as catalysts for this autogenous carbon monoxide shift reaction, which produces hydrogen and carbon dioxide.

Saturated steam from the cogeneration electric power plant, or from the syngas-cooling steam generator, is admitted as a reactant in a conventional catalytic carbon monoxide shift reactor, using a side-stream of relatively cool syngas 72, which has passed through the syngas-cooling steam generator, to produce a high-hydrogen syngas 73, when additional hydrogen is needed in the syngas to be used for fuel methanol production. The additional hydrogen required in the syngas is thus provided by the carbon monoxide shift reaction, sometimes referred to as the watershift reaction. See previous reference, "Chemistry of Coal Utilization, pages 893 and 894". In this reaction, some of the carbon monoxide of the syngas is oxidized by water, as steam, to carbon dioxide, thereby taking oxygen from the steam and releasing hydrogen therefrom. This may generally be necessary for providing the two-to-one mole ratio or hydrogen to carbon monoxide, in order to provide optimum feedstock for the production of fuel methanol from the pressurized clean syngas.

The present invention provides the processing capability for making adjustments in the ratio of the two feedstock materials, in order to compensate for the high degree of inherent variability in chemical and physical composition of the solid waste materials, and for the short-term and long-term variabilities in the rates of accumulation and delivery of the solid waste materials for any project area. Many difficulties would be encountered in storing the large quantities of solid waste materials which would be required to compensate for the inherent variabilities in both the fuel value and the quantity of solid waste materials, in order to provide reasonably constant feed rates, and to avoid serious and perhaps frequent turndowns in operating capacity and consequent reductions in productivity and profitability. The present invention also makes possible and profitable the mining of many existing landfills for the recovery and utilization of buried solid waste resource materials, where there has not been too much degradation of the fuel value of the materials from natural conversion to the pollutants, methane and/or carbon dioxide. This can allow avoiding the high costs of mining, transporting and reburying solid waste materials in new approved landfills, where that would otherwise be required.

The variabilities in quantity and quality are accommodated by the process and means of the invention, while maintaining continuity of operations and reasonably constant production capacity, which are both critical to the economics of most chemical processing operations. This is made possible by co-utilizing the fragmented solid waste materials and particulate carbon fuel as gasification feedstocks, thereby providing the capability for varying the percentages of the two feedstock materials, within acceptable limits, for example throughout the range from forty percent PCF to sixty percent PCF, on a fuel value basis, these being examples, not limits. The storage of large amounts of the PCF may be readily and inexpensively provided, while the storage of large amounts of solid waste materials would present serious problems and environmental hazards, and is most undesirable.

The particulate carbon fuels (PCF), used as gasifier feedstock, are produced from Methacoal fuels, in the Methacoal fuel separation plant, at the gasification project site, and are stored as dry particulate material in PCF storage silos, in adequate quantities to accommodate the variability in fuel values and rates of delivery of the solid waste materials. The PCF is moved to and from storage, and to the gasifying furnace, as fluidized solids in conventional equipment available for such purposes, and which use inert gas as the transport medium, for safety purposes and to protect the quality of the reactive PCF.

The fuel methanol recovered by thermal separation from Methacoal fuel at the Methacoal fuel separation plant, is returned by the fuel methanol pipeline to the Methacoal fuel plant for reuse, again and again, as the fluid transport medium. A portion of the return methanol stream may be processed to recover materials extracted from the coal or lignite, if this becomes necessary, or in cases where it may be profitable to do so. The particulate carbon fuel, recovered from the Methacoal fuel, is fed to the solid waste gasifying furnace, simultaneously with feeding of the fragmented solid waste material. In the preferred embodiment, the two feedstock materials are fed separately to the gasification furnace, as described hereinbelow, but in other embodiments could be fed by first blending PCF with the fragmented solid waste.

The ratio of PCF to fragmented solid waste, on a fuel value basis, may be varied within reasonably broad limits. The minimum percentage of PCF, which must be provided at any time, to prevent experiencing seriously detrimental effects on performance of the gasification process and equipment, will depend primarily on the moisture content and fuel value of the solid waste materials being used as feedstock, and these may be expected to vary greatly. The facilities could perhaps be operated with PCF feedstock only, however, this would defeat principal purposes of the invention, which are to provide practical and economical means for utilizing the solid waste resource materials, while eliminating the need for landfills, waste incineration, various fuel uses of waste, and those waste materials recycling activities which are not profitable or which present health hazards. Biomass materials, either produced as waste from farm crops, or biomass materials produced specifically for gasification, could also be used as feedstock materials for the gasifying furnace of the present invention.

There must always be sufficient percentages of the highly reactive PCF to allow achieving the very high gasification reaction rates and high temperatures required for simultaneous gasification, slagging, melting and vaporizing of the feedstock materials. The initial gas temperatures developed by reactions of the premixed oxygen and superheated steam with the particulate carbon fuel will be in the range of three-thousand to four-thousand degrees Fahrenheit, and are controlled at the levels within that range, proven during actual operations to be required for maintaining acceptably low viscosities of the fluid slags produced and good percentages of carbon conversion. Slag viscosities should be in the range of about twenty to sixty centipoise for ease of tapping and utilizing most slags, for gravity separation of the molten slag and the heavier metals in the furnace, and for achieving good quality of the slag products. Gas temperatures throughout the reaction zone and the bottom of the gasifying furnace, though lower than the initial reaction temperatures, must also be sufficiently high to insure the rapid slagging, melting, or vaporizing of essentially all of the non-combustible solids in the fragmented solid waste, in the coal or lignite-derived particulate carbon fuels, and in the mineral additives used for control of the slagging process, before the product syngas reaches the syngas outlets from the gasifying furnace.

The high-quality syngas exiting the gasifying furnace is produced with maximum combined carbon monoxide and hydrogen content and with minimum amounts of hydrocarbons and carbon dioxide. A mixture of reactant oxygen and superheated reactant steam, adequately premixed as required, is used for achieving the very rapid gasification reactions with the PCF, and the very high gas temperatures produced thereby, to facilitate producing syngas from the combustible portions of all the feedstock materials, and for maintaining the gas temperatures sufficiently high to either liquefy or vaporize essentially all of the non-combustible solids in the feedstock materials. This will generally require oxygen-to-steam mole ratios of about forty to fifty percent oxygen in the oxygen-steam mixture. See previous reference, "Chemistry of Coal Utilization, pages 954 and 955".

The low-viscosity fluid slag, with rock-like chemical/mineral composition, is produced primarily from the non-metallic non-combustible components of the feedstock materials. The chemical composition of the fluid slag is controlled by using the necessary mineral additives, in the required amounts, to provide low eutectic points (or low melting temperatures) for the mixtures of materials which form the low-viscosity fluid slags. This facilitates achieving complete liquefaction of the slag-producing materials, low fluid slag viscosities, and ease of removal by tapping of the low-viscosity fluid slag from near the bottom of the gasifying furnace. See previous reference, "Chemistry of Coal Utilization, pages 955 through 957", and additional references cited therein.

The chemical composition of the fluid slag is also controlled, to some extent, within desirable limits which are determined during actual operations, to facilitate obtaining the desired physical characteristics of the important coproduct, light-weight aggregates. The practical limits of fluid slag composition may be determined experimentally, and slag composition may then be monitored and controlled by using periodic chemical analyses of the materials produced from the fluid slag, and making necessary adjustments in slag composition by using the appropriate mineral additives.

The "silica ratio", which is defined as the ratio of dioxide to the combination of silicon dioxide, ferritic iron oxide. magnesium oxide and calcium oxide ; is an important parameter in studying and controlling the characteristics of slags, as reported in the above references. However, there will usually be very little ferritic iron oxide in these slags, because of the highly reducing conditions provided by the principal products of gasification, hydrogen and carbon monoxide. Most of the iron present as iron oxides and iron sulfides should be reduced to the metallic form and recovered with other metals as marketable coproduct. Frequent adjustments in slag composition may be necessary, because of the high degree of variability which may be expected in the non-combustible solids portion of the feedstock materials, and because of the variations necessitated in the proportions of solid waste materials and particulate carbon fuel.

Very hot syngas, exiting from the top of the gasifying furnace, will be passed first through water-heating and nucleate-boiling sections (not shown) of the syngas-cooling steam generator shown in FIG. 1. The tubing of the water-heating and nucleate-boiling sections of the syngas-cooling steam generator is capable of tolerating the high temperatures of the initial syngas, and are used to substantially and quickly reduce those temperatures. If necessary, in some circumstances, the gases may be slightly precooled in the furnace by adding low temperature saturated steam or a mixture of low-temperature saturated steam and hot water (not shown), as discussed hereinbelow, in order to protect the tubing in the syngas cooling steam generator.

The somewhat lower temperature syngas, after passing through the initial feedwater heating and/or saturated steam generating tubing, then passes through the steam superheater tubing (not shown) in the syngas-cooling steam generator, where the syngas temperatures are further reduced as the steam is superheated. The steam superheating tubing could not tolerate the very high gas temperatures of the initial syngas exiting the gasifying furnace. Additional saturated steam generation tubing is also provided after the superheater tubing, to further reduce the syngas temperatures. The final syngas cooling is completed in the feedwater heating section of the syngas-cooling steam generator, as shown in FIG. 1. If additional syngas cooling is required, beyond the capability of the feedwater heaters to remove and utilize such heat, combustion air or feedwater may be pre-heated for the cogeneration power plant. It may be necessary to waste some low temperature heat through air-cooled or water-cooled heat exchangers, in some cases.

The cooled syngas 74, exiting the feedwater heater, is thus reduced in temperature sufficiently to facilitate the removal, in a dust removal plant 75, of entrained particulate materials, which are expected to be primarily metallic dust 76, in most cases. In the event that substantial unburned carbon is found in the metallic dust, it may be separated therefrom and returned to the PCF storage for return to the gasifying furnace. The cooled syngas, after removal of the metallic dust, is compressed as required in the syngas cleaning plant 77, preferably using steam turbine-driven centrifugal compressors (not shown), to the pressures required for the particular conventional syngas cleaning methods and equipment selected and used.

Standard syngas cleaning methods and equipment have been developed and commercially demonstrated in the United States in recent years by both Government and Industry. Good examples are the gas-cleaning processes demonstrated at the Coolwater Integrated Gasification Combined Cycle Power Plant project, at Doggett, Calif., and those used for the very large Great Plains Coal Gasification Project, in North Dakota, both previously referred to herein. These methods and equipment may be used satisfactorily for the syngas cleaning for the present invention. After removal of carbon dioxide, nitrogen oxides, sulfur compounds, and other contaminants and diluents, the cleaned syngas is compressed in the syngas compression plant, to the synthesis reaction pressure required for methanol production. The specific pressure required depends on which of the conventional methanol synthesis processes and catalysts are selected. The pressurized clean syngas is then delivered to the fuel methanol plant for synthesis conversion to fuel methanol. In other embodiments, some or all the pressurized clean syngas may be used for producing mixtures of methanol and higher alcohols, or for producing ammonia.

Various materials removed from the syngas during syngas cleaning, are recovered as byproducts for marketing, or to provide feedstock materials for product manufacturing. These include metallic dust, unreacted carbon from the metallic dust, elemental sulfur 78, carbon dioxide 79 in gaseous or solid form, and nitrogen 80 in gaseous or liquid form. The particulate solids, as metallic dust removed from the cooled syngas, may be processed for recovery of metals and other useful materials, and the remaining materials may be returned (recycled) to the feedstock for the gasifying furnace. Other coproducts of value (not shown) are also produced, including excess-capacity liquid or gaseous oxygen, liquid or gaseous nitrogen, and air-reduction trace gases, from the air reduction plant. Surplus hydrogen may be produced by carbon monoxide shift reaction and recovered from the purge-loop gases exiting the condensers of the methanol plant, and could be recovered and prepared for marketing as either gaseous hydrogen or liquid hydrogen, when sufficient markets develop.

The solid waste materials are thus completely restructured and made useful by their conversion to marketable products, coproducts, byproducts and inert gases. Fragmented metals such as automobiles, home appliances, metal food containers, sheet metal roofing, and various other forms of light metals, may be added to the solid waste feedstock for the gasifying furnace. Even lead storage batteries, may be added to the feedstock, and the lead compounds of the battery should all be converted to metallic lead and other recoverable materials. It is also probable that shredded vehicle tires and some iron ores, especially pyrites and marcasites, may be useful as additional feedstock materials. Both would produce significant amounts of byproduct elemental sulfur. High-sulfur coals will be preferred for Methacoal fuels production, since both the iron and the sulfur from the coals will be recovered and marketed.

Sewage plant solids could be accepted as feedstock, either in the dried form or as concentrated sludge, to provide a practical, beneficial and environmentally acceptable means of disposal thereof. Waste oils, lubricants and solvents, though not solids, will be desirable as additions to the feedstock materials. Hydrocarbon contaminated soils or clays could be used as mineral additives to provide a means of disposal which is less costly than currently required incineration, and without the environmentally questionable residues of incineration, which require disposal.

Medical wastes and many other materials classified as toxic wastes or hazardous wastes may be accommodated as feedstock additions without concern, and with great savings and environmental benefits. Because of the very high temperatures and reducing conditions achieved, there cannot be any dioxins or bacteria remaining in any of the product, coproduct or byproduct materials. There will be no remaining solids which must be disposed of by landfill operations or by other means of temporary or permanent storage for undesirable or unsanitary waste materials. Only minimal amounts of inert gaseous effluents, which are primarily carbon dioxide and nitrogen, will be discharged to the atmosphere. In many areas, most or all of the carbon dioxide recovered may be marketed for tertiary oil recovery and for other uses.

The fuel methanol produced may be beneficial to the environment in various ways, such as providing neat methanol (methanol only) as low-pollution oxygenated automotive fuel, blended auto fuels made with the use of gasolines, blended methanol-ethanol-additive automotive fuels (called Trinary Fuels), superior-quality higher-efficiency gas turbine fuels, diesel fuel replacement using Avocet additive, and fuels for new types of very high efficiency methanol-fueled combined cycle power plants. The invention may be applied primarily for the purposes of eliminating unsanitary landfills, sometimes inappropriately called sanitary landfills; costly and environmentally undesirable incineration, often used for solid waste volume reduction; and environmentally undesirable use of solid waste as refuse-derived fuels for steam or electric power generation, which exacerbates other serious environmental problems.

Conventional sorting and recycling of various materials, from the solid waste materials collected, may be accommodated to the extent that it is desirable and profitable. Where it is unprofitable or impractical, sorting and recycling may be entirely eliminated, and all the waste materials may be accepted as feedstock for the gasifying furnace of the invention. It may be beneficial and desirable to remove heavy metal objects before fragmentation, to protect the fragmenting equipment. It may be profitable to remove aluminum, either before or after fragmentation, depending on how much aluminum is oxidized in the gasifying furnace and lost to the slag.

Most municipal solid waste problems, and many other solid waste problems, can therefore be profitably eliminated, wherever such improvements are considered sufficiently valuable so that the "status quo" may somehow be altered, for profits, for conservation of valuable materials, for the benefit of all mankind, and for the preservation and improvement of his habitat, the Global Environment.

Still referring to FIGS. 1 and 2, both process flow diagrams, the preferred embodiment includes also the integration, into the overall process and means of the invention, of a fuel ethanol plant 81, for producing fuel ethanol 82, adjacent an existing coal or lignite-fired power plant 83, which provides the electric energy 84 and the process steam 85, for the fuel ethanol plant and for other uses. For efficient use in the fuel ethanol plant, and for other process heating requirements, the process steam is provided by using turbine exhaust extraction steam 86, from the coal or lignite-fired power plant, in a condensing-boiling steam generator 87, from which condensate 88 is returned to the power plant feedwater system. This makes unnecessary the additional feedwater preparation which would be required if the steam from the power plant were used directly or consumed as processing steam.

Feedwater for generating saturated steam for use as process steam, using the condensing-boiling steam generators, requires only minimal feedwater treatment, since the process steam is not subsequently superheated. This method therefore effects substantial cost reductions and also reduces inconvenience and problems, which would otherwise be encountered in operation of the coal or lignite-fired power plant, which in many cases will be qualified as a cogeneration facility after integration into such project facilities.

In the preferred embodiment, the fuel ethanol plant is designed with approximately one-half the volumetric capacity of the fuel methanol plant with which it is integrated, thus providing sufficient fuel ethanol for blending at a ratio of one part of fuel ethanol to two parts of fuel methanol, for Trinary Fuels production. This provides the two principal ingredients for use in the Trinary Fuels blending plant, for the production of Trinary Fuels. A fuel ethanol pipeline 89 is provided to transport the fuel ethanol from the fuel ethanol plant to the Trinary Fuels blending plant. In other embodiments of the invention, the fuel ethanol may be transported by other means such as tank trucks, rail tank cars, or barges, and fuel methanol of fuel ethanol may be produced in various other proportions, and may be marketed or used for other purposes. The Trinary Fuels are composed of approximately sixty percent fuel methanol, thirty percent fuel ethanol, six or eight percent unleaded gasolines as an additive, diethyl ether, and other additives.

Carbon dioxide 90 from the fuel ethanol plant may be used for tertiary oil recovery, to enhance agricultural production, as an inert gas, as a cryogenic gas, and for other purposes, with surpluses vented to the atmosphere. The fuel ethanol plant will use corn for ethanol 91, as feedstock for the production of fuel ethanol by fermentation, and will produce as coproducts: distillers dried grains (DDG) 92 and dried corn solubles (DCS) 93. These coproducts will be used primarily in a Total Mixed Ration (TMR) feed plant 94, to produce TMR feeds for ruminants 95, (ruminant animals). Other farm products 96 are used with the indispensible ingredients for their production, DDG and DCS, to produce the cubed TMR feeds. These include corn, alfalfa, molasses, various other grains, minerals and vitamins. The TMR feed production facilities and technologies are an integral part of the process and means of the present invention, contributing greatly to the value, utility and profitability thereof.

These unique animal feeds, developed through many years of research and extensive experiments by the Illinois State Department of Agriculture and the University of Illinois, can provide the total feed requirements, including vitamins and minerals, for cattle and other ruminant animals. They are especially effective and advantageous for operating cattle feed lots 97 for producing Clean-Lean-Beef 98, which is of the very highest premium quality; for sale to other beef cattle feeders; and also for substantially increasing the production rate and quality of dairy products. TMR feeds may be sold to animal feed markets 99 for all ruminant animals. Beef and dairy cattle grow more rapidly and are healthier and more productive than if fed by other means, and waste in feeding is substantially reduced. Beneficial high-protein food supplements (not shown) for human consumption can also be produced from the dried corn solubles of these ethanol plants.

Methacoal fuel used for supplying the particulate carbon fuel, the enabling feedstock for gasification of the solid waste materials, is produced in the Methacoal fuel plant, located near the coal or lignite-fired power plant. The same lignite or coal mines 100 provide the coal or lignite 101 for the coal or lignite-fired power plant, and for producing the Methacoal fuel. The fuel methanol 102, for Methacoal fuel production, is delivered to the Methacoal fuel plant from the fuel methanol plant, by the fuel methanol pipeline. The Methacoal fuel is delivered from the Methacoal fuel plant to Methacoal fuel storage, at the Methacoal fuel separation plant, by the Methacoal fuel pipeline. In other embodiments, other means of transportation may be used, in some cases, if they are cost-competitive, or if situations are encountered where pipelines cannot be constructed or used.

The two principal integrated facilities required are: 1) the fragmented solid waste and particulate carbon fuel utilization facilites for the production of fuel methanol, building materials and byproducts, at or near the source of the solid waste materials and integrated with a cogeneration electric power plant, and; 2) the coal or lignite and agricultural products utilization facilities for the production of fuel ethanol, Methacoal fuel, and TMR animal feeds, integrated with a coal or lignite-fired power plant near the lignite or coal source, and with the beef cattle feeding operations. These are integrated through the pipelines, or other modes of transportation, and through the Trinary Fuels blending plant, which provides substantial markets for the fuel alcohols as low-cost Trinary Fuels for use in unmodified motor vehicles, dual fuel engine motor vehicles, or motor vehicles with minor modifications to the fuel systems and carburetors or fuel injectors.

In other embodiments, the fuel ethanol plant and the TMR feed plant may be integrated with, and located adjacent to, the solid waste gasification and fuel methanol production facilities. Both principal facilities are then preferably integrated with either a new cogeneration electric power plant, or with a modified existing steam-electric power plant; which can provide all of the steam requirements not provided by the gasification project facilities; and which can also provide all the electric energy requirements for the processing facilities, while producing additional electric energy for the participating electric utility, or for sale to utility companies.

Figure 4:
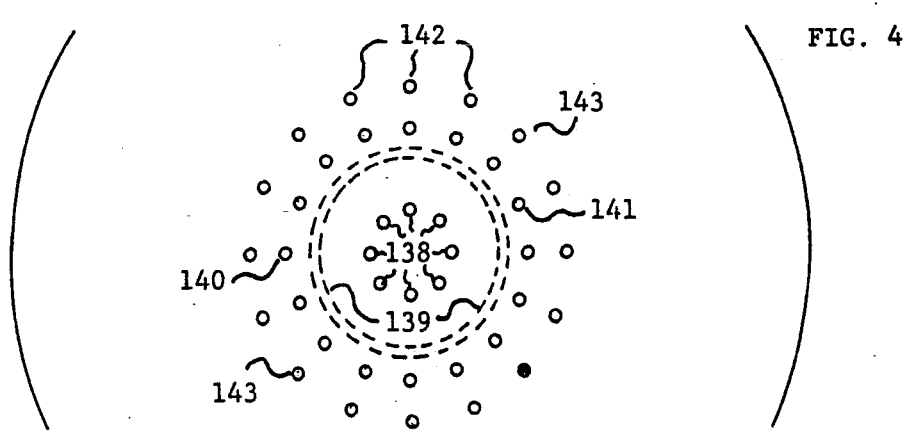
FIG. 4 is a horizontal cross-sectional view through the upper portion of the primary reaction zone within the gasifying furnace of the preferred embodiment.

FIGS. 3 and 4, present schematic illustrations of the gasifying furnace of the preferred embodiment, in order that one skilled in the art may understand this unique, cylindrical, vertical axis, low pressure, high temperature, slag-bed gasifier; and to make clear the means whereby it is capable of gasifying all the combustible components of the feedstock materials, slagging all the non-metallic non-combustible solids of the feedstock materials and the additives, liquefying or vaporizing all the metallic components of the feedstock materials, and reducing many compounds of the feedstock materials to their elements, or to other, often simpler, compounds. For example, reducing the iron in the iron sulfides to metallic iron, which is recovered as metal, and the sulfur therein to gaseous sulfur compounds, which are later recovered as elemental sulfur in the syngas cleaning operations.

FIG. 3 is a cross-sectional elevation view taken through the center of the solid waste gasifying furnace 103, a cylindrical, vertical axis, low pressure, high temperature, slag-bed gasifier. The outer furnace shell 104 is a water cooled steel double wall, to allow recovery of the heat passing through the graphitized carbon furnace lining 105, and the insulating refractory materials 106 between the furnace lining and the outer furnace shell, and to facilitate maintaining uniform temperature gradients through the materials of the cylindrical furnace walls. The furnace lining is made of graphitized carbon blocks or cast in place graphitized carbon lining materials, and is backed by the insulating refractory materials to reduce the rate of flow of heat from the furnace.

Such furnaces must be relatively large in diameter, in order to provide a large slag surface area for protecting the graphitized carbon lining of the furnace bottom 107 and the graphitized carbon lining of the furnace shell, from damage by significant concentrations of unreacted oxygen, which might otherwise come in contact with the graphitized carbon. The diameter of the furnace is approximately the same dimension as the height thereof, and these dimensions, per unit of gasification capacity, will be relatively large, compared to pressurized gasifiers of the same capacity. However, the costs for these very low pressure gasifying furnaces should be modest by comparison, since the pressurized gasifiers typically require metal-walled pressure vessels, with walls several inches thick, and complicated high-pressure feed lock-hoppers, or slurry feeding systems, and high-pressured quenching and removal means for the partially-slagged ash.

Slag tap openings 108, are provided at various points around the periphery of the lower furnace walls for removing fluid slag by tapping, either intermittently or continuously, as is done in the case of removing slags and metals from electric furnaces, which also operate at very low pressures. The position of the slag runners is shown in FIG. 1, and they were described hereinbefore. Metal tap openings 109 are provided at various points around the periphery of the furnace walls, lower than the slag tap openings, and very near the bottom of the furnace. The molten metals may be removed therefrom by periodic tapping. The position of the metal runners is also shown in FIG. 1, and they were described hereinbefore.

Relatively large syngas exit ports 110 are provided around the periphery of the gasifying furnace, at the top of the furnace walls, and are connected to refractory-lined syngas ducts 111. The syngas ducts have double metal walls with inert gas therebetween for safety, as described in U.S. Pat. No. 4,097,217, titled "Method for Converting Combustors from Hydro-Carbonaceous Fuels to Carbonaceous Fuels", issued to one of the co-inventors hereof. These ducts will transport the hot syngas to the syngas-cooling steam generators. Two or more sets of syngas ducts and two or more syngas-cooling steam generators are used, in order to facilitate uniform flow of syngas from the gasifying furnace into the ducts, and to minimize the lengths of the ducts required. The syngas-cooling steam generators and carbon monoxide shift reactors, shown in FIG. 1, should be located at sufficient distances from the furnace to allow adequate access for slag tapping and metal tapping operations, which are located at positions around the furnace, and near the furnace bottom.

For the preferred embodiment, a dome-shaped furnace top 112 is shown, since this provides good self-supporting mechanical characteristics for the structure, and facilitates holding the refractory furnace top lining 113 thereunder. It also assists in supporting the various gasifying furnace feedstock and reactant feed equipment above and at the central areas of the dome-shaped furnace top. In other embodiments, a cone frustrum-shaped furnace top may be used. A conical feed hopper 114 serves as a surge chamber for the two lock hoppers 115, which alternately feed fragmented solid waste 116 into the conical feed hopper, in such a manner that there is no escape of syngas from the furnace through the conical feed hopper.

The lock hoppers are purged by steam or inert gas after emptying, and the purge steam or gas is passed through the conical hopper and into the gasifying furnace. The empty lock hoppers are vented to a fume collection system during filling. Conveyor chutes 117 from conveyors (not shown), above the lock hoppers, alternately feed fragmented solid waste into one lock hopper then the other, as required. Various conventional conveyor arrangements and equipment are available to deliver the fragmented solid waste into the lock hoppers. In other embodiments, only one lock-hopper may be used, or more than two lock-hoppers may be used.

Figure 5:
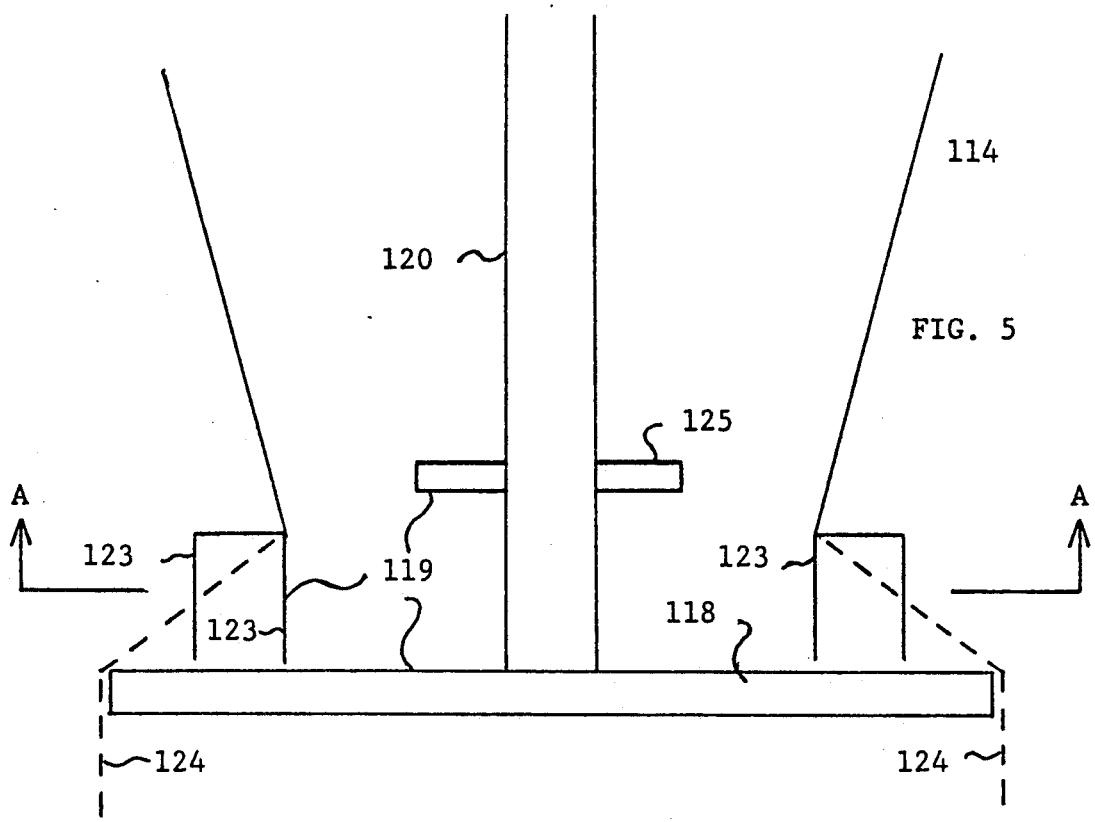
FIG. 5 is a vertical cross-sectional view taken on the centerline of the conical feed hopper, the feeder-distributor, the rotatable hollow center shaft and the rotatable circular feeder table.
Figure 6:
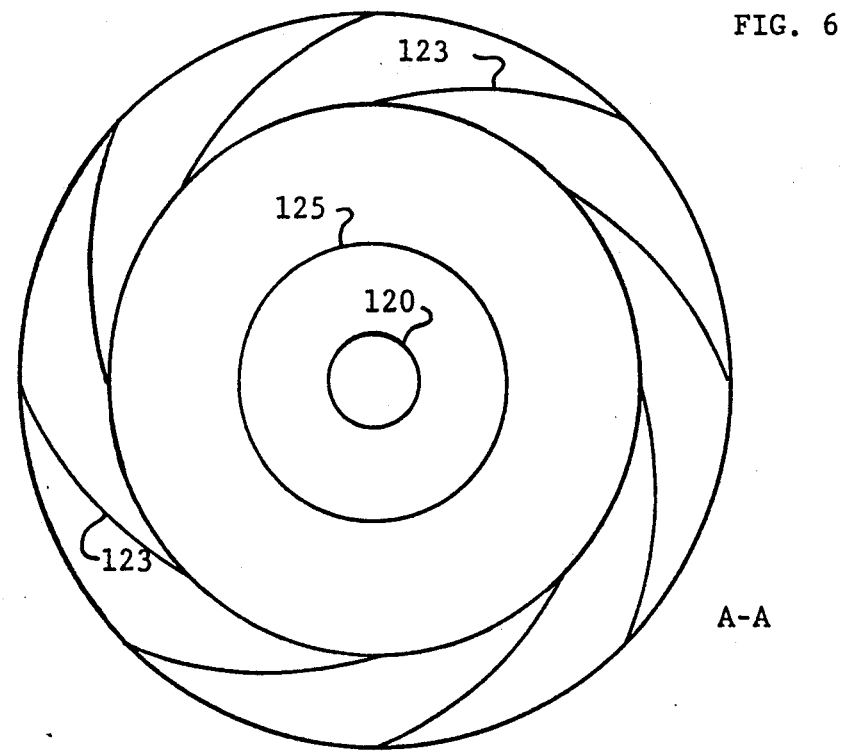
FIG. 6 is a horizontal cross-sectional view taken on the plane A—A, shown in FIG. 5, looking upward at the curved vertical-band spiral elements of the horizontal mounting plate above them, and the surge-preventing circular table mounted on the rotatable hollow center shaft.

The fragmented solid waste material is fed from the conical feed hopper to the gasifying furnace in such a manner that the material is dropped continuously as a cylindrical-shaped curtain of material, falling uniformly from all points around the entire periphery of the rotating feeder table 118, of the feeder-distributor 119, at the center of and underneath the conical feed hopper. For reference regarding the feeder-distributor see U.S. Pat. No. 3,306,501, titled "Feeder Apparatus", granted to one of the co-inventors hereof and assigned to Monsanto Company in 1967. This is truly a mass flow feeder, in that all the material in the hopper remains continuously in motion, though moving very slowly, so long as the feeder table is turning. The mass flow rate is a function of the rotating speed of the feeder table only, and is approximately proportional to that rotating speed, with no other controls required, or even usable. FIGS. 5 and 6 show details of the feeder-distributor for clarification.

For the preferred embodiment, the rotating feeder table is refractory coated on the underneath side and is water-cooled or gas-cooled to provide protection from the extreme radiant heat it is exposed to from below. The other feeder parts and the hopper are protected from the heat by injecting ambient temperature inert carbon dioxide gas or low temperature steam, under slight positive pressure, inside the conical hopper, so it is forced to flow downward through the conical hopper and the feeder-distributor, and then into the gasifying furnace. The rotating feeder table is supported from above by a hollow rotatable center shaft 120, mounted in radial and thrust bearings 121 at the top of the conical feed hopper. The rotatable feeder table is rotated by the hollow rotatable center shaft, which is driven by a variable-speed drive mechanism 122, above the center of the conical feed hopper.

The diameter of the flat rotatable feeder table is considerably larger than the outer extremities of the feeder's spiral elements 123, which begin at the throat of the conical feed hopper, extend vertially downward therefrom, and spiral uniformly outward therefrom as they progress in the direction of rotation of the feeder table, the spiral plates remaining vertical, to a terminal point some distance outside the diameter of the throat of the conical feed hopper, and displaced radially in the direction of rotation of the feeder table to a point on a radius thereof whereupon the next successive spiral element begins at the throat of the conical feed hopper. Three or more spiral elements are preferred for this particular application, and several are considered more advantageous. This arrangement of the spiral elements allows moving the solids off the outer periphery of the rotating feeder table at uniform rates, at all points around its periphery, to form the cylindrical curtain 124 of falling dispersing fragmented solid waste materials, to facilitate the rapid combustion and gasificiation reactions required. A smaller diameter surge control table 125, is located slightly above the throat of the conical feed hopper, and is mounted on and rotated by the same rotating center shaft as the rotating feeder table.

Heated oxygen 126, from an oxygen heater 144, shown in FIG. 1, at the optimum temperature for desired performance; which optimum temperature must be established by operating experience for the specific gasifying furnace, feedstock materials, and operating conditions; is passed through the rotating center shaft and discharged downward through oxygen nozzles 127, shown in FIG. 3, positioned below the central portion of the rotating feeder table. This places the oxygen inside the cylindrical curtain of solid waste materials, thus exposing the solid waste materials to the highly reactive oxygen at the optimum initial ambient or pre-heated temperatures for process control. This facilitates the very rapid partial oxidation and complete oxidation reactions, between the solid waste materials and oxygen, as the surrounding reaction gases force the materials inward toward the center of the furnace and downward toward the bottom of the furnace.

Still referring to FIG. 3, the mixture of reactant oxygen and superheated reactant steam 128, adequately pre-mixed, is continuously fed downward through alternately positioned nozzles 129 in a larger diameter circle of nozzles, around the outside of the falling curtain of solid waste materials. The other alternately positioned nozzles 130, in or near the same circle, feed reactive particulate carbon fuel 131, as fluidized solids in inert gas or steam, at controlled feed rates, and directed downward between the alternate streams of the pre-mixed reactant oxygen and superheated reactant steam.

The resultant combined gasification reactions between the reactive particulate carbon fuel and the mixture of reactant oxygen and superheated reactant steam, encompass the solid waste materials inside a cylindrical envelope formed by the very rapidly reacting and very high temperature gases produced by the reactions. The temperatures of the product gases formed by the reactions of the particulate carbon fuel and the mixture of reactant oxygen and superheated reactant steam will generally be within the range of three-thousand to thirty-five hundred degrees Fahrenheit, with the temperature at any time depending primarily on the mole ratio of reactant oxygen to superheated reactant steam, in the mixture thereof, which is injected into the reaction zone, through alternate nozzels, with the reactive particulate carbon fuel. See previous reference, "Chemistry of Coal Utilization, pages 954 and 955".

Increasing the mole ratio of oxygen to steam in the mixture thereof, will increase the temperature of the reacting gases, but this also increases the amount of carbon dioxide which is produced in the syngas, and which must be removed later in syngas cleaning. Under equilibrium conditions, the maximum gasification efficiency results when the mole-basis oxygen concentration in the pre-mixed reactant oxygen and superheated reactant steam, fed to the gasifying furnace, is in the range of forty to forty-eight percent oxygen. These concentration levels correspond to maximum temperatures, in the reaction zone, in the range of twenty-seven hundred and thirty-two degrees Fahrenheit (fifteen hundred degrees Centigrade) to thirty-two hundred and seventy-two degrees Fahrenheit (eighteen hundred degrees Centigrade). Increasing the mole ratio of oxygen in the reactant mixture could take the temperatures to about four thousand degrees Fahrenheit. See previous reference, "Chemistry of Coal Utilization, pages 954 and 955".

The downward moving mass of high temperature reacting gases will accelerate as they expand, move downward, and impinge upon the surface of the underlying molten slag layer 132, near the bottom of the furnace, and above the molten metals layer 133. The reacting gases will then turn horizontally outward in all directions, toward the outer cylindrical walls of the furnace, travelling along the molten slag surface 134, and diminishing in velocity as they travel outward. This carries the hottest gases over the surface of the molten slag, and also tends to move any particulate materials, which may remain in the gas stream, downward onto the slag surface, where particles may stick and remain while continuing to react and gasify, melt, or vaporize. By the time the gases reach the graphitized carbon lining of the furnace walls, essentially all of the oxygen will have been consumed by the reactions, and the remaining gases will be primarily reducing gases, carbon monoxide and hydrogen.

In order to obtain nearer optimum percentages of hydrogen in the gases within the gasifying furnace, additional steam 135, either saturated or superheated, is added through another even larger diameter circle of downward directed steam nozzles 136 outside the primary reaction zone 137, and about midway between the center of the furnace and the furnace lining of the outer peripheral walls. A water-steam mixture (not shown) may also be added in this area, as discussed hereinbelow. The nozzles of this outer circle are directed downward so the steam may encompass and react with the already reacting gases in the outer portion of the primary reaction zone, and may assist in preventing highly oxidizing gases from reaching the graphitized carbon lining of the furnace shell, by containing them and moving them downward toward the molten slag surface 134. This admission of steam will also produce some additional carbon monoxide shift reaction and carbon-steam reaction within the furnace, and surplus steam may also be used to lower the exiting syngas temperatures. The carbon monoxide shift reaction will provide additional hydrogen, thus minimizing the amount of hydrogen which must be produced afterward, in the catalytic carbon monoxide shift reactor, shown in FIG. 1.

FIG. 4 is a horizontal cross section taken through the upper central portion of the furnace, near the top of the primary reaction zone therein. It depicts the concentric circular arrangements of the feedstock and reactant materials, as they begin their downward flow into the primary reaction zone of the furnace. The streams of oxygen 138, which are admitted at optimum temperatures for process control purposes, as required by the nature of the solid waste materials being used, are shown near the center of the concentric circles, with the larger diameter cylindrical curtain of solid waste materials 139 encompassing them. The alternately positioned streams 140 of pre-mixed reactant oxygen and superheated reactant steam and the alternately positioned streams 141 of reactive particulate carbon fuel injected with inert gas or steam, are both shown in the second encompassing circle.

The alternately positioned streams are shown as small circles, alternately clear 140, and then dark 141, which form the large circle. The streams of additional steam 142 shown as small clear circles, are shown in the third encompassing large circle, with a few additional streams of reactive particulate carbon fuel 143 shown as small darkened circles, provided in or near the same circle. These additional streams of reactive particulate carbon fuel can provide more carbon-steam reactions, if this proves advantageous with some feedstock materials or under some particular operating conditions, and would tend to reduce the presence of unreacted oxygen in the outer areas of the gasifying furnace, when this is found to be beneficial.

In the preferred embodiment, the waterheating, steam generation and steam superheating functions (not shown) of the syngas-cooling steam generator shown in FIG. 1, are arranged in a unique manner for optimum performance and economy. The feedwater is first heated by the cooling of syngas in the feedwater heater to reduce syngas temperatures to the lowest practical levels before cleaning and compression of the syngas. Following additional heating in the furnace shell, or with parallel heating therein and in the feedwater heater; low-quality saturated steam (a mixture of vapor and tiny water droplets) is generated in the syngas cooling steam generator, at the design pressure. The design pressure must be established during design and engineering for a specific gasification project, since this pressure also inherently establishes the pressure of the superheated steam generated. Steam pressures must be sufficiently high to minimize the volumetric requirements of steam headers, steam generator tubing, superheater tubing, etc. Optimum steam pressures will generally be in the ranges of a few hundred pounds per square inch.

The saturated steam must be produced with controlled quality, having more than sufficient liquid droplets remaining therein to contain all of the soluble and insoluble contaminants from the untreated or minimally treated feedwater used. This low-quality saturated steam generation is accomplished in the syngas-cooling steam generator, with the pressure of the saturated steam controlled, which also controls the pressure of the superheated steam produced from the saturated steam. This low-quality saturated steam is then passed through a conventional vapor-liquid phase separator (not shown), similar to the steam drums of conventional boiler plants, to produce clean saturated steam for subsequent superheating in the same syngas-cooling steam generator. The phase separator also produces controlled amounts of hot water, at the same temperature as the steam, which will contain all the dissolved and suspended contaminants of the initial feedwater.

The clean saturated steam, from the phase separator and its demister, is then superheated in the syngas-cooling steam generator, to the temperature level required for gasification process control. The reactant oxygen and superheated reactant steam are premixed, as required, and as described in the previous references, for admission to the gasification zone of the furnace to sustain the gasification reactions. The hot water from the phase separator is taken by pipeline to the top of the furnace, where it is mixed with superheated steam at temperatures in the range of five-hundred to one-thousand degrees Fahrenheit, preferably in dynamic venturis, thereby forming mineral-bearing and mineral salt-bearing superheated steam at the resultant temperature, which is somewhat lower than the original superheated steam temperature. This contaminant-bearing superheated steam must be maintained at near-critical velocities, after mixing with the contaminant-bearing water, while being immediately fed into the gasifying furnace as streams of additional steam as shown in FIG. 4. The high steam velocities and the substantial turbulence induced by the dynamic venturis are sufficient to prevent salting out and buildup of the mineral materials and mineral salts in the feed pipes or nozzles carrying the steam into the furnace.

The entrained solids and mineral salts in the lower temperature superheated steam will have no detrimental effect on the gasification reactions, and may therefore be tolerated in the process. They are relatively clean materials compared to the other feedstock materials, and some may serve as beneficial catalysts for the gasification process, as noted in the previous references. Most important, this provides means for avoiding the very high costs and difficulties of physically and chemically treating feedwater for the entire gasification process, in order that the saturated steam may be superheated in the conventional manner. If difficulties are encountered in this process, for any project or set of circumstances encountered, then the dirty hot water may be admitted directly into the gasification zone of the furnace, by being blown therein as streams of fine mist formed in venturis, with minimum quantities of either saturated or superheated steam required, to accomplish the same purpose.

The total integration of these various processes and facilities, as described in regard to this preferred embodiment, are desirable for achieving the optimum benefits, results and profits from all the resources and technologies utilized therein. It has been estimated, using U. S. Environmental Protection Agency data, and U. S. Department of Energy data, that the conversion of all the municipal solid waste alone, which is collected in the United States, by use of this process and means, could provide approximately one-third of the Nation's total peacetime gasoline requirements.

The costs per gallon of the Trinary Fuels to the motoring public or to fleet owners is estimated to be in the range of fifty to seventy cents per gallon, without subsidies, thus allowing the fuels to be taxed at the same rate, per unit of fuel value, as gasolines are taxed, and still providing bargains in fuel value compared to purchasing available gasolines or diesel fuels, at the time of this writing. The savings to the Nation can be many billions of dollars per year in reduced expenditures for foreign crude oil and petroleum products, money which could remain in the United States, and which will have great beneficial multiplying effects on the economy, if spent internally instead of being "exported" in payment for crude oil and petroleum-derived fuels, which the Nation does not actually need, since we could profitably produce our own automotive fuels.

Although this invention has been described with a certain degree of particularity, it is understood that the present disclosure is made only by way of example, as a preferred embodiment, and that numerous changes in the details of construction and the combination and arrangement of parts may be resorted to without departing from the spirit and the scope of the invention, reference being had for the latter purpose to the appended claims.

What is claimed is:

1. A process for effecting virtually complete physical and chemical restructuring of municipal solid waste, other solid wastes, and other waste materials, hereinafter referred to as "solid waste materials", by high-temperature thermo-chemical conversion of said solid waste materials, in combination with particulate carbon fuel which is highly reactive, and using oxygen and steam as gasification reactants, thereby producing marketable products, coproducts and byproducts, and leaving no waste solids which must be disposed of by burying in landfills or by other means of solid waste containment and storage, and releasing only minor amounts of clean inert gases to the atmosphere, said process comprising;

preparing gasification feedstock materials for storage, handling and feeding into a gasifying furnace, said gasification feedstock materials comprising said solid waste materials, with the particle sizes of said solid waste materials being reduced by conventional means of fragmentation to maximum dimensions in the range of two inches to three inches, as a first said gasification feedstock material, and comprising particulate carbon fuel, which is highly reactive and which is produced from coal or lignite, as a second said gasification feedstock material;

feeding said gasification feedstock materials simultaneously into said gasifying furnace, wherein simultaneous gasification, slagging, melting, and vaporizing of said gasification feedstock materials, and of mineral additives used to control the slagging process and the fluid characteristics of the molten slag, are all effected, said gasifying furnace facilitating the operation of a gasification process, utilizing the conventional and well-known gasification reactions to provide a low-pressure, high-temperature, totally-slagging gasification process;

providing storage means for large quantities of said particulate carbon fuel, thus making possible substantial adjustments in the proportions of said solid waste materials and said particulate carbon fuel being fed into said gasifying furnace, thereby allowing for the accommodation of inherent day-to-day variations, seasonal variations, and year-to-year variations, in the quantities and the fuel values, of said solid waste materials which are collected, processed and used as one of said gasification feedstock materials, while maintaining ratios of the two said gasification feedstock materials within the effective limits which allow adequately controlling and continually operating said gasification process at reasonable capacity levels for effective process control and profitable operation of the processing facilities;

gasifying, slagging, melting and vaporizing said gasification feedstock materials, simultaneously, and at very high gasification reaction temperatures and near-atmospheric pressures in said gasifying furnace wherein pre-mixed reactant oxygen and superheated reactant steam are used as a gasification reactant mixture, while said reactant oxygen and said superheated reactant steam are also used separately, as said gasification reactants, said gasification reactions producing syngas which is typical for such conditions, having a high hydrogen content, high carbon monoxide content, near-zero methane content, and variable, but low, carbon dioxide content, said carbon dioxide content depending in amount on the feedstock characteristics and operating conditions;

converting most non-combustible solids contained in said solid waste materials, in said particulate carbon fuel, and in said mineral additives used to control the composition and fluid characteristics of said molten slag, or fluid slag, by the very high temperatures of said gasification reactions, in the range of three thousand to four thousand degrees Fahrenheit, and by the very strong reducing nature of the products of said gasification reactions, to said molten slag of low viscosity, to molten metals, and to metal vapors, collecting said molten slag in a molten slag layer near the bottom of said gasifying furnace and overlying a molten metals layer, collecting said molten metals in said molten metals layer, at the bottom of said gasifying furnace, removing said fluid slag and said molten metals separately by conventional tapping of said gasifying furnace, and recovering said fluid slag and said molten metals as valuable coproducts of said gasification process, said metal vapors being carried out of said gasifying furnace with the flow of said syngas exiting said gasifying furnace, and being condensed to powder-like metallic dust in a syngas cooling steam generator, as the temperatures of said syngas are reduced therein, and are then recovered as metallic dust in the cleaning of said syngas;

controlling the mineral-chemical composition of said fluid slag by the use of appropriate said mineral additives such as silica, iron oxides, limestone, and alumina, as needed, thus maintaining low eutectic points (low melting temperatures) of said fluid slag and facilitating gravity separation of the heavier said molten metals from the lower-density, low-viscosity said fluid slag, separately removing said fluid slag and said molten metals by said tapping through conventional tap-holes at different elevations, from near the bottom of said gasifying furnace, using said mineral additives to provide some control of the quality of foamed light-weight aggregates and rock-wool insulating materials, which are produced from said fluid slag as valuable coproducts;

removing said fluid slag from said molten slag layer, through said tap-holes of said gasifying furnace, and transferring said fluid slag by slag-runners to the desired location, where most of said fluid slag is poured, as controlled-diameter small streams of said fluid slag, into pools of water of controlled depths, forming rounded particles, or granules, of said light-weight aggregate, which are removed and classified as sized coproducts for subsequent use in concrete products manufacturing, for light-weight concrete construction, for roadbuilding, and for various other purposes, using some of said fluid slag for producing dense rock-like aggregate, called dense slag-rock, for crushing and screening for use as heavy aggregate for concrete construction and for railroad ballast or fill materials, and using some of said fluid slag for producing said rock-wool insulation materials by conventional blowing methods used for this purpose, thus conserving the energy generally required for melting of mineral materials to form molten mineral slags generally used in the blowing processes for the manufacture of such useful inert insulating materials;

removing said molten metals through said tap-holes from said molten metals layer near the bottom of said gasifying furnace and beneath said molten slag layer, and transferring said molten metals by metal runners to casting machines, casting in molds and cooling to form metal ingots to facilitate handling, said metal ingots being usable for producing metals and alloys, or marketed as raw materials for the metal refining industries, precious metals being recovered in the metals refining operations and from metals removed from the bottom of said gasifying furnaces during outages;

removing heat energy of the high temperature said syngas exiting said gasifying furnace, by heating feedwater, generating saturated steam, and superheating steam in a syngas cooling steam generator and its feedwater heater, passing a side-stream of cool syngas from said syngas cooling steam generator through a carbon monoxide shift reactor, and reacting said syngas with saturated process steam, the carbon monoxide shift reaction providing additional hydrogen in a stream of high-hydrogen syngas which is re-mixed with said syngas from said gasifying furnace, in the amounts necessary for adjusting the mole ratio of said hydrogen to said carbon monoxide of the product said syngas, to a two-to-one mole ratio of said hydrogen to said carbon monoxide, some of the heat generated in said carbon monoxide shift reactor being removed by generating saturated steam therein, said saturated steam being subsequently superheated in said syngas cooling steam generator, thus utilizing said heat energy for the purposes of preheating said feedwater, generating saturated steam from said feedwater, and superheating said saturated steam to produce superheated reactant steam for use in said gasifying furnace, the removal of said heat energy thus effecting the cooling of said syngas to the required temperatures for removal therefrom of particulate materials including said metallic dust, said syngas cooling being supplemented as required by air-cooled or water-cooled heat exchangers recovering heat energy for other purposes, or for wasting surplus said heat energy to cooling water or to the atmosphere;

providing additional saturated steam, required for supplementing said saturated steam generated in said syngas cooling steam generator, and similarly used for subsequent said superheating in the same said syngas cooling steam generator, from a cogeneration electric power plant, which is made an integral part of the facilities provided, said cogeneration electric power plant also providing the electric energy required for said integrated facilities and selling surplus electric energy to utilities in the area, said additional saturated steam being provided by turbine exhaust extraction steam, used in condensing-boiling steam generators for producing said additional saturated steam, with condensate from said condensing-boiling steam generator being returned to said cogeneration electric power plant to conserve boiler feedwater for said cogeneration electric power plant, and to reduce treatment requirements and costs for said boiler feedwater, providing additional superheated steam, directly from superheated steam headers in said cogeneration electric power plant, said additional superheated steam being used for powering steam turbines driving air compressors of an air-reduction oxygen plant, providing reactant oxygen for said gasification reactions, said additional superheated steam also being used to power other steam turbines driving syngas compressors of a syngas cleaning plant and syngas compressors of a syngas compression plant, with exhaust condensate from said steam turbines being returned to said cogeneration power plant to conserve said boiler feedwater, and to reduce treatment requirements and costs for said boiler feedwater, thus improving energy utilization efficiencies and reducing operating costs for all the integrated facilities provided;

cleaning and purifying hot said syngas exiting said gasifying furnace, said syngas having been cooled in said syngas-cooling steam generator and said feedwater heater, supplemented as required by said heat exchangers for cooling said syngas, by removing said particulate materials including said metallic dust, chemical impurities, and undesirable diluents therefrom, which, if not removed, would adversely affect subsequent synthesis reactions, said syngas being cleaned and purified by using the best available standard dust removal methods and equipment and gas cleaning methods and equipment, and the purified gaseous product, cleaned syngas, is then further compressed in said syngas compression plant providing pressurized clean syngas;

converting said pressurized clean syngas by synthesis reaction to fuel methanol, using a standard fuel methanol plant, surplus heat energy being recovered from said fuel methanol plant, and said surplus heat energy therefrom being used for generating steam for superheating in said syngas-cooling steam generators;

recovering said byproducts from said syngas cleaning plant by proven, conventional means, in forms which are marketable as byproduct materials, sulfur present in chemical compounds is converted to elemental sulfur for marketing as such, metallic dust recovered from syngas cleaning is marketed to metal refiners, carbon dioxide gas from syngas cleaning is used as inert gas and marketed for tertiary oil recovery and for other conventional uses, and nitrogen gas from syngas cleaning is used as inert gas and marketed to the cryogenics industries to the extent possible, surplus carbon dioxide and nitrogen being discharged to the atmosphere, adequate provisions are made and proper precautions are taken in all designs, processes and operations to minimize environmental impacts, the escape of undesirable effluents of any kind, or production of any solid remnants of processing which would require burying in said landfills, or disposal by said other means of waste containment and storage.

2. The process of claim 1, wherein said cogeneration electric power plant is a new facility, designed for use as an integral part of the gasification project facilities, said electric energy is provided therefrom for said integrated facilities, and surplus said electric energy is sold to local or regional utility companies.

3. The process of claim 1, wherein said cogeneration electric power plant is provided by the modification of an existing steam-electric power plant, the modified said steam electric power plant being used as the cogeneration steam electric power plant described therein.

4. The process of claim 1, wherein said cogeneration electric power plant is provided as a Methacoal Integrated Combined Cycle Power Plant, (MICC) power plant, the Methacoal fuel provided for separation of said Methacoal fuel for the operation of said MICC power plant and also for a Methacoal fuel separation plant providing said particulate carbon fuel for said gasification project facilities, is made from coal or lignite from low-cost remote sources, and said fuel methanol is produced from low-cost remote natural gas sources, or alternatively said fuel methanol is produced, by coal gasification, from the same said coal or lignite used for the production of said Methacoal fuel, and said Methacoal fuel is delivered by Methacoal fuel pipelines or by combinations of said Methacoal fuel pipelines and marine tankers or barges, to the site of said gasification project facilites, and condensate liquid fuels and pulverulent carbonaceous fuels, produced from said Methacoal fuel, are consumed by said MICC power plant, thus leaving said fuel methanol, which is produced at said fuel methanol plant of said gasification project facilities, and also said fuel methanol which is separated from said Methacoal fuel delivered for producing said particulate carbon fuel for said gasification reactions, both available for local or regional marketing as said fuel methanol, or for use in the production of Trinary Fuels, said Trinary Fuels being blended alcohol fuels containing approximately sixty percent said fuel methanol, thirty percent fuel ethanol, eight to nine percent unleaded gasoline, and one to two percent of selected ethers and other additives.

5. The process of claim 1, wherein a fuel ethanol plant is located in close proximity to said gasifying furnace and said cogeneration electric power plant, and said cogeneration electric power plant also provides process steam and electric energy for said fuel ethanol plant, the product said fuel ethanol being either sold as such or being blended with said fuel methanol for the production of Trinary Fuels, which are blended alcohol fuels containing approximately sixty percent said fuel methanol, thirty percent said fuel ethanol, eight to nine percent unleaded gasoline, and one to two percent of selected ethers and other additives, the coproducts of said fuel ethanol production, distillers dried grains (DDG) and dried corn solubles (DCS), being sold as such or used for various purposes.

6. The process of claim 1, wherein a fuel ethanol plant is located near a distant coal or lignite-fired power plant, receiving said coals or lignite from a nearby lignite or coal mine, and said coal or lignite is also used for producing Methacoal fuel in a Methacoal fuel plant located near said lignite or coal mine or near said coal or lignite-fired power plant, and said Methacoal fuel is transported by a Methacoal fuel pipeline, or by other carrier, to Methacoal fuel storage at said gasification project facilities, said fuel methanol for said Methacoal fuel plant is transported by a fuel methanol pipeline, or by other carrier, from said fuel methanol plant, an integral part of said gasification project facilities, to said Methacoal fuel plant, for production of said Methacoal fuel; process steam and electric energy for said fuel ethanol plant is provided from the adjacent said coal or lignite-fired power plant, said fuel ethanol is either sold as such or is blended with said fuel methanol for the production of Trinary Fuels, which are blended alcohol fuels containing approximately sixty percent said fuel methanol, thirty percent said fuel ethanol, eight to nine percent unleaded gasoline, and one to two percent of selected ethers and other additives, the coproducts of said fuel ethanol production, distillers dried grains (DDG) and dried corn solubles (DCS), being sold as such or being used for various purposes.

7. The process of claim 5, wherein a Total Mixed Ration (TMR) feed plant is provided, and said TMR feeds, being cubed feeds for ruminants (ruminant animals) are produced as an advantageous and profitable means for utilizing the distillers dried grains (DDG) and dried corn solubles (DCS), both coproducts of the fermentation fuel ethanol process using corn feedstock, and said DDG and DCS are combined with alfalfa, corn, other grains, molasses, minerals and vitamins for the production of said TMR feeds, and said process steam and said electric energy, for said TMR feed plant, are also provided from the same said cogeneration electric power plant, which provides said steam and said electric energy for said fuel ethanol plant.

8. The process of claim 6, wherein a Total Mixed Ration (TMR) feed plant is provided, and said TMR feeds, being cubed feeds for ruminants (ruminant animals) are produced as an advantageous and profitable means for utilizing the distillers dried grains (DDG) and dried corn solubles (DCS), both coproducts of the fermentation fuel ethanol process using corn feedstock, and said DDG and DCS are combined with alfalfa, corn, other grains, molasses, minerals and vitamins for the production of said TMR feeds, and said process steam and said electric energy, for said TMR feed plant, are provided from the adjacent said coal or lignite-fired power plant.

9. The process of claim 5, wherein said fuel ethanol facility is sized in relation to said fuel methanol plant, so that the two alcohol products, said fuel methanol and said fuel ethanol, are available in the ratio of about two volumetric units of said fuel methanol to one volumetric unit of said fuel ethanol, and the two said alcohol products are blended in this approximate ratio, about eight to nine percent of low-octane unleaded gasoline is added thereto, and other additives such as selected ethers, lubricants and anti-corrosion chemicals are used, to provide competitively-priced said Trinary Fuels (TF) for use as automotive fuels in vehicles with Otto cycle engines, thus providing a significant source of alternative automotive fuels, which can greatly reduce automotive exhaust emissions and also reduce dependence on foreign crude oil and petroleum products.

10. The process of claim 6, wherein said fuel ethanol facility is sized in relation to said fuel methanol plant, so that the two alcohol products, said fuel methanol and said fuel ethanol, are available in the ratio of about two volumetric units of said fuel methanol to one volumetric unit of said fuel ethanol, and the two said alcohol products are blended in this approximate ratio, about eight to nine percent of low-octane unleaded gasoline is added thereto, and other additives such as selected ethers, lubricants and anti-corrosion chemicals are used, to provide competitively-priced said Trinary Fuels (TF) for use as automotive fuels in vehicles with Otto cycle engines, thus providing a significant source of alternative automotive fuels, which can greatly reduce automotive exhaust emissions and also reduce dependence on foreign crude oil and petroleum products.

11. Means for effecting complete physical and chemical restructuring of solid waste materials, including municipal solid waste, and various other solid wastes, by high temperature thermo-chemical conversion of said solid waste materials, in combination with particulate carbon fuel, to marketable products, coproducts and byproducts, thereby leaving no waste solids which must be disposed of by burying in landfills or by other means of solid waste containment and storage, and releasing only minor amounts of clean inert gases to the atmosphere, said means comprising;

a gasifying, slagging and metals recovery furnace, hereinafter referred to as a gasifying furnace, said gasifying furnace being a cylindrical bodied, vertical axis, low pressure, high temperature, slag bed type of said gasifying furnace, having a furnace shell which is made of metal, and which is double-walled metal and is water-cooled, said furnace shell containing an inner furnace lining made of graphitized carbon materials, said furnace lining being able to resist damage from the very high temperatures of reacting gases and product gases formed by gasification reactions therein, and from the molten slag and molten metals produced and accumulated therein, said furnace lining being backed with refractory materials, between said graphitized carbon materials of said inner furnace lining and said furnace shell, to minimize heat losses through said furnace lining and to the cooling water of said furnace shell, and to maintain uniform temperature profiles through said graphitized carbon materials, furnace tap-holes being provided at two or more elevations around the periphery of said gasifying furnace, near the bottom thereof, for separately removing said molten slag and said molten metals from said gasifying furnace, said gasifying furnace having a dome-shaped furnace top, containing a refractory lining thereunder for protection from the very high temperatures of said reacting gases and said product gases thereunder, and having a double-walled outer shell which is water cooled;

said furnace top supporting, at and near its center, equipment for feeding gasification feedstock materials into said gasifying furnace, and for feeding gasification reactants into said gasifying furnace, with said gasification feedstock materials consisting of fragmented said solid waste materials and highly reactive said particulate carbon fuel, and with said gasification reactants consisting of a mixture of reactant oxygen and superheated reactant steam, said oxygen used as such and introduced either at ambient temperatures or at elevated temperatures, said superheated reactant steam introduced as such, saturated reactant steam, and mixtures of steam and hot water, all fed downward at or near the top of and in the central areas of said dome-shaped furnace top of said gasifying furnace;

said gasifying furnace comprising an interior chamber located inside of said inner furnace lining, said interior chamber being bounded by said furnace top, side walls of said furnace shell, and a slag surface of a slag bed containing molten slag produced by the high temperatures of said gasification reactions, said side walls extending between said furnace top and said slag surface, said interior chamber comprising a central area and a peripheral area, said central area extending from said equipment for feeding said gasification feedstock materials and said gasification reactants downward through said central area and onto said slag surface, said slag surface extending radially outward from a lower portion of said central area to said side walls, said peripheral area being located around said central area so as to be interposed between said central area and said side walls, said central area, said slag surface and said peripheral area forming a flow path, wherein said gasification feedstock materials and said gasification reactants are introduced into the top of said central area by said equipment for feeding said gasification feedstock materials and said gasification reactants, and wherein they react to form a mixture of reacting gases and product gases, said reacting gases and said product gases flowing downward through said central area to said slag surface where they are forced radially outwardly into said peripheral area, said gases then flowing upward through said peripheral area;

said gasifying furnace having exit ports in said side walls, near said furnace top, said exit ports communicating with said peripheral area, said exit ports being used for withdrawing said product gases, called syngas, from said gasifying furnace;

refractory lined ducts are connected to said exit ports, said ducts transporting said syngas to a syngas-cooling steam generator, said ducts having double metal walls, with an opening therebetween for circulating inert cooling gas, wherein said circulating cooling gas also serves as a monitoring medium for detection of poisonous gas leakage, thus providing safe containment and transmission therethrough of said syngas.

12. The means of claim 11, wherein the feeding system for feeding said fragmented solid waste materials into the gasification furnace comprises conveyor feed chute(s) for feeding said solid waste materials into one or more conventional lock-hoppers, said lock-hoppers providing gas-tight seals, while accumulating batches of said solid waste materials and while feeding said batches of said solid waste materials into a conical feed hopper therebelow, said conical feed hopper being positioned above and at the center of said dome-shaped furnace top of said gasifying furnace, said conical feed hopper providing a surge bin and collecting hopper for said solid waste materials coming from said lock-hopper(s) above, and delivering said solid waste materials, by gravity flow, into a feeder-distributor provided therebelow;

said feeder-distributor feeds said solid waste materials from said conical feed hopper, said feeder-distributor being a mass-flow table feeder, using a horizontal, circular feeder table which is rotatable, said mass-flow feeder being provided with multiple spiral elements, said spiral elements being stationary, curved, vertical, metal bands, each said spiral element starting at the circumference of the throat at the bottom of said conical feed hopper, (the smallest diamter thereof), and each spiralling uniformly outward in the direction of rotation of said feeder table of said feeder-distributor, to an optimum point at a larger radius from the center of said feeder table, each said spiral element reaching only to a terminal point on a radius extended from the circumference of the throat of said conical feed hopper, which said terminal point is outside the beginning end of the next said spiral element, said spiral elements being positioned just fractions of an inch above, but not touching, the rotatable said feeder table, and being firmly attached at their upper edges to the bottom side of a horizontal annular-shaped mounting plate, said mounting plate being attached to the throat of and to the inside lower walls of said conical feed hopper, said feeder table being sufficiently larger in diameter than the outer extremities of said feeder-distributor's said spiral elements, to allow the outer vertical faces, or sides, of said spiral elements to effect the uniform distribution of said fragmented solid waste materials on the surface areas of said feeder table, which are outside said spiral bands, as said feeder table rotates;

said feeder-distributor thus effects a uniform flow of said fragmented solid waste materials over the periphery of said rotatable feeder table, while said feeder table is rotating, flowing at all points around its circumference, and at discharge rates of said solid waste materials which are direct functions of the rotating speed of said rotatable feeder table, the hollow center shaft which supports and rotates said feeder table being supported in radial and thrust bearings mounted at the top of said conical feed hopper, and being rotated by a variable-speed driving mechanism to allow accurate control of the feed rate of said fragmented solid waste materials into said primary reaction zone of said gasifying furnace, for process control purposes, thus effecting the downward movement of said fragmented solid waste materials as a thin, falling, cylindrical-shaped curtain of said fragmented solid waste materials, with pure said oxygen, admitted either at near-ambient temperatures or after being heated to elevated temperatures, said oxygen being transported downward through a tube or tubes, passing through said hollow center shaft, and being discharged at controlled feed rates through oxygen nozzles pointed downward and mounted underneath said feeder table, thus providing direct contact of highly reactive said oxygen with said fragmented solid waste materials, to cause complete oxidation reactions and partial oxidation reactions to take place very rapidly, followed by other gasification reactions, thus oxidizing and gasifying combustible components of said fragmented solid waste materials and producing carbon monoxide gas, carbon dioxide gas, hydrogen gas and superheated water vapor;

and wherein means provided for simultaneously feeding said gasification reactants and said highly reactive particulate carbon fuel into said gasifying furnace, comprise one set of alternately positioned nozzles, in or near a first circle of such said nozzles, positioned just outside said cylindrical curtain of said fragmented solid waste materials, said nozzles passing through said dome-shaped furnace top of said gasifying furnace, are used to feed a pre-mixed mixture of reactant oxygen and superheated reactant steam, downward into said primary reaction zone of said gasifying furnace, while another set of alternately positioned said nozzles, in or near said first circle of said nozzles, and passing through said dome-shaped furnace top of said gasifying furnace, feeds reactive said particulate carbon fuel, as fluidized solids carried by steam or inert gas, downward into said primary reaction zone, between the alternately positioned streams of pre-mixed said reactant oxygen and superheated reactant steam, to achieve the very rapid gasification reactions between reactive said particulate carbon fuel and the pre-mixed mixture of said reactant oxygen and superheated reactant steam, producing said gasification reactions, said gasification reactions having been shown to take place, almost to completion, in about ten milliseconds, thus the falling said cylindrical-shaped curtain of said fragmented solid waste materials, while being oxidized, is surrounded by very high temperature said reacting gases and products of said gasification reactions, at controlled initial temperatures in the range of three thousand to four thousand degrees Fahrenheit;

a second circle, or set of circles, of said nozzles, said circle or circles being even larger in diameter, and with said nozzles passing through said dome-shaped furnace top, and being positioned about midway between the center of said gasification furnace and the cylindrical said furnace walls, and outside the alternatively positioned said nozzles in said first circle of said nozzles described above, is used to feed mixtures of said saturated steam and hot water, or mixtures of said superheated steam and hot water, as best effects optimum process and operating controls, to effect additional reactions of steam with said carbon monoxide, by effecting said carbon monoxide shift reaction, thus producing some additional said hydrogen, and to react with unreacted carbon in the said reacting gases to produce said carbon monoxide, said carbon dioxide, and said hydrogen, with additional nozzles also being provided for feeding reactive said particulate carbon fuel, as said fluidized solids carried by other said steam or said inert gases, through other said nozzles in these outer said second circles of nozzles, in event this proves to be advantageous or necessary during operation of the gasifying furnace in some situations.

13. The process for simultaneously gasifying combustible components of gasification feedstock materials; converting most non-combustible components of said gasification feedstock materials to molten slag, molten metals and metal vapors; thermochemically reducing some metal-bearing compounds of said gasification feedstock materials to elemental metals and gaseous compounds; and thermochemically reducing many components of said feedstock materials to chemically simpler molecular forms, said process comprising;

gasifying, slagging, melting, vaporizing and thermochemically converting, simultaneously, said gasification feedstock materials in a unique, cylindrical bodied, vertical axis, low pressure, very high temperature, slag-bed protected gasifying furnace, said gasifying furnace having a furnace shell made of metal, said furnace shell being double-walled and cooled by circulating water therebetween, and containing a furnace lining of graphitized carbon materials, said furnace lining being capable of resisting damage from the very high temperatures of synthesis gas (syngas) produced therein by gasification reactions, and from the molten slag and molten metals produced in said gasifying furnace and accumulated in separate layers therein, said molten metals being in a layer at the bottom of said gasifying furnace and below the layer of said molten slag, said furnace lining being backed with insulating refractory materials, between said graphitized carbon materials of said furnace lining and the inner wall of said furnace shell, to minimize heat losses through said furnace lining and said furnace shell, and to maintain uniform temperature profiles through said graphitized carbon materials of said furnace lining;

conventional tap-holes being provided at two or more elevations around the periphery of said gasifying furnace, near the bottom thereof, for separately removing said molten slag and said molten metals from said gasifying furnace, said gasifying furnace having a dome-shaped furnace top, the outer shell thereof being of double-walled metal construction, and containing a refractory lining thereunder for protection of said outer shell from the very high temperatures of the reacting gases and of the product gases thereunder, said outer shell of said dome-shaped furnace top being water-cooled, said dome-shaped furnace top supporting or assisting in supporting, the equipment providing said gasification feedstock materials and gasification reactants for said gasifying furnace;

said gasification feedstock materials for said gasifying furnace being of two classes: 1) particulate carbon fuel, and 2) fragmented materials, wastes and fuels; said particulate carbon fuel comprising coal or lignite-derived particulate carbon fuel, finely pulverized coal or lignite, or methanol activated pulverulent carbonaceous fuel; and said fragmented materials, wastes and fuels comprising a wide variety of materials which may be combustible, partially combustible or non-combustible, and may include fragmented municipal solid waste, fragmented light metals, fragmented industrial waste, sewage plant solids or sludges, medical waste, biological waste, other waste materials, shales with high carbon content, shales with high hydrocarbon content, hydrocarbon contaminated soils or clays, vehicle tires and scrap rubber, lead storage batteries, refinery waste materials, waste solvents and solvent sludges, chemical wastes, agricultural waste materials, biomass materials produced for gasification, sulfur-bearing iron ores, other metal ores, and mineral additives used to control slagging and the viscosity of said molten slag, and various other materials;

said fragmented materials, wastes and fuels being prepared by conventional means of particle size reduction, to sizes smaller than about one inch, and mixed or blended sufficiently to minimize variability to acceptable levels for handling and for feeding to said gasifying furnace, and to sustain reasonably uniform gasification, slagging, melting and vaporization of the components of said fragmented materials, wastes and fuels, another requirement being that the combined feedstock materials contain sufficient combustible materials to sustain the gasification reactions and to produce sufficiently high resultant temperatures of product syngas and of slagging solids to maintain temperatures of said molten slag in the ranges effecting low viscosities of fluid slag, to facilitate tapping of said fluid slag from said gasifying furnace, and the production from said fluid slag of light-weight foamed aggregate, dense slag-rock aggregate and rock wool insulation materials;

gasification reactants required to sustain and complete said gasification reactions and to provide the heat energy for said slagging, melting, vaporizing and thermochemical conversions comprising mixtures of pre-mixed reactant oxygen and superheated reactant steam, ambient temperature reactant oxygen, heated reactant oxygen, superheated reactant steam, saturated reactant steam, and mixtures of steam and water;

mixed or blend said fragmented materials, wastes and fuels, herein after referred to as "materials" are feed to said gasifying furnace, the feeding system for said materials comprising conveyor feed chute(s) receiving said materials and feeding said materials into one or more lock-hoppers which form gas-tight seals while feeding said materials into a conical feed hopper therebelow and positioned above the center of said gasifying furnace, said conical feed hopper acting as a surge bin and collecting said materials from said lock-hopper(s) above and delivering them by gravity flow into the feeder-distributor, said feeder-distributor being a mass-flow table feeder, using a horizontal, circular, feeder table which is rotatable, and using vertical-band metal spiral elements, starting at the circumference of the throat at the bottom of said conical feed hopper (the smallest diameter thereof), and spiralling uniformly outward in the direction of rotation of said feeder table of said feeder-distributor, to an optimum larger radius, each said spiral element reacting only to a point on a radius extended outward from the circumference of the throat of said conical feed hopper, which point is outside the beginning end of the next said spiral element, with said spiral elements being positioned just fractions of an inch above, but not touching, the rotatable said feeder table, and being firmly attached to the bottom of said conical feed hopper by a circular horizontal mounting plate, said feeder table being sufficiently larger in diameter than the outer extremities of said feeder-distributor's said spiral elements, allowing the outer vertical faces, or sides, of said spiral elements to effect uniform distribution of said materials on the surface areas of the rotating said feed table which are outside said spiral bands;

said feeder-distributor thus effecting uniform flow of said materials over the periphery of said rotatable feeder table, while rotating, at all points around its circumference, and at discharge rates which are direct functions of the rotating speed of said rotatable feeder table, with the hollow center shaft which supports and rotates said feeder table being supported in radial and thrust bearings mounted at the top of said conical feed hopper, said feeder table and said hollow center shaft being rotated by a variable-speed driving mechanism to allow accurate control of the feed rate of said materials into the primary reaction zone of said gasifying furnace, wherein said materials are fed over the edges of said feeder table to fall downward as a cylindrical-shaped curtain of said materials, with pure said oxygen, admitted either at near-ambient temperatures or after being heated to elevated temperatures, said oxygen being transported downward through a tube or tubes, through said hollow center shaft, and exiting through oxygen nozzles mounted underneath said feeder table, thus providing direct contact of said oxygen with said materials, to cause complete oxidation reactions and partial oxidation reactions, with combustible portions thereof, to take place very rapidly, thus oxidizing and gasifying the combustible components of said materials, producing carbon monoxide gas, carbon dioxide gas, hydrogen gas and superheated water vapor;

simultaneously, a first set of alternately positioned nozzles, in or near a first circle of such said nozzles, just outside said cylindrical curtain of said feedstock materials, and passing through said dome-shaped top of said gasifying furnace, feed pre-mixed reactant oxygen and superheated reactant steam, downward into said primary reaction zone of said gasifying furnace, a second set of alternately positioned said nozzles, in or near the same circle of said nozzles, and passing through said dome-shaped top of said gasifying furnace, feeds said reactive carbon fuel, as fluidized solids carried by steam or inert gas, downward into said primary reaction zone, between the alternately positioned streams of pre-mixed reactants, to achieve the very rapid gasification reactions between reactive said particulate carbon fuel and said pre-mixed reactant oxygen and superheated reactant steam, said gasification reactions have been shown to take place almost to completion in about ten milliseconds, thus surrounding the falling and oxidizing said materials with high temperature said reacting gases and reaction product gases, at controlled initial temperatures in the range of three thousand to four thousand degrees Fahrenheit;

a set of similar said nozzles is positioned in or near a second circle of said nozzles, said second circle of nozzles being of even larger diameter, said nozzles passing through said dome-shaped top of said gasifying furnace, and positioned about midway between the center of said gasifying furnace and said furnace walls, outside the alternately positioned said nozzles in or near said first circle of nozzles described hereinabove, are provided for injecting said saturated steam, or said superheated steam, or mixtures of said saturated steam and hot water, or mixtures of said superheated steam and said hot water, as best effects optimum process and operating controls, to react with said carbon monoxide by said carbon monoxide shift reaction, thus producing some additional said hydrogen, and to react with unreacted carbon in said reacting gases to produce said carbon dioxide, said carbon monoxide and said hydrogen, and with provision made for also feeding reactive said particular carbon fuel, as said fluidized solids carried by said steam or said inert gases, through other said nozzles in these outer said second circles of said nozzles, in event this proves to be advantageous or necessary during operation of the gasifying furnace with some feedstock combinations and in some operating situations;

said process makes possible the conversion of said gasification feedstock materials, as described hereinabove, to useful and valuable products including said syngas, which can be used as feedstock for the production of fuel methanol; fluid slag, which can be used to produce light-weight aggregates, dense aggregates and inert rock-wool insulating materials; metal ingots, for use in metal refining processes; metal vapors which are condensed and recovered as metallic dust in syngas cooling and cleaning; sulfur compounds in the syngas, which are converted to elemental sulfur in the syngas purification process; and carbon dioxide and nitrogen gases, which can be marketed to the extent possible, with the surplus gases being vented to the atmosphere;

the process hereof provides unique opportunities for profitable utilization, as opposed to costly disposal, for many undesirable materials, waste materials and hazardous waste materials; for the utilization of high sulfur coal or lignite resources, with both the iron and sulfur from the iron sulfides being recovered in marketable forms; for the utilization of iron sulfide ores and other mineral ores, to economically recover their metals and sulfur; for the utilization of high fuel-value shales to produce syngas, sulfur and slag products; and for utilization of biomass waste materials and biomass produced for its fuel values; with all the combined feedstock materials being converted to valuable products, coproducts, byproducts and inert gases, eliminating the need for recycling, landfills, waste incineration, refuse-derived fuels projects, and waste to energy projects. They also provide new opportunities to utilize high sulfur coals and lignites, sulfur-bearing mineral ores, biomass waste materials and fuels, and high fuel value shales which are usually also high in sulfur content.

* * * * *